United States Patent
Shibuya et al.

(10) Patent No.: US 6,586,106 B2
(45) Date of Patent: Jul. 1, 2003

(54) THERMOPLASTIC RESIN FILM SATISFACTORY IN PRINTABILITY

(75) Inventors: Nobuhiro Shibuya, Ibaraki (JP); Kazuhisa Kitamura, Ibaraki (JP); Ayako Shibata, Ibaraki (JP); Yasuo Kitani, Mie (JP); Kazuhide Hayama, Mie (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 09/921,747

(22) Filed: Aug. 6, 2001

(65) Prior Publication Data

US 2002/0054991 A1 May 9, 2002

Related U.S. Application Data

(63) Continuation of application No. PCT/JP00/00594, filed on Feb. 3, 2000.

(30) Foreign Application Priority Data

Feb. 5, 1999 (JP) .................................... 11-028920

(51) Int. Cl.$^7$ ........................... B32B 27/00; B32B 31/00
(52) U.S. Cl. ................. 428/474.4; 428/412; 428/478.8; 428/480; 428/515; 428/516; 428/411.1; 427/372.2; 427/384; 427/393.1; 427/407.1; 264/129; 264/289.3
(58) Field of Search ............... 428/474.4, 480, 428/478.8, 411.1, 412, 516, 515; 427/372.2, 384, 393.1, 407.1; 264/129, 289.3

(56) References Cited

U.S. PATENT DOCUMENTS

| | | | | |
|---|---|---|---|---|
| 3,725,520 A | * | 4/1973 | Suzuki et al. | 264/41 |
| 4,427,732 A | * | 1/1984 | Gray, III et al. | 428/172 |
| 5,068,070 A | * | 11/1991 | Gunji et al. | 264/41 |
| 5,776,604 A | * | 7/1998 | Lu et al. | 428/343 |
| 5,827,627 A | * | 10/1998 | Cleckner et al. | 430/18 |
| 6,194,060 B1 | * | 2/2001 | Amon et al. | 428/315.9 |
| 6,217,687 B1 | | 4/2001 | Shibata et al. | 156/82 |

* cited by examiner

*Primary Examiner*—P. Hampton-Hightower
(74) *Attorney, Agent, or Firm*—Oblon, Spivak, McClelland, Maier & Neustadt, P.C.

(57) ABSTRACT

Described is a thermoplastic resin film having on a surface thereof a hydroxy-modified imine polymer containing repeating units represented by the following general formula (I) in an amount of 5 mol % or more based on the total of repeating units. This thermoplastic resin film has ink transfer, adhesion and aging stability, and excellent printability of generating no back ghost when offset printing using oxidation polymerization type ink is performed on both faces

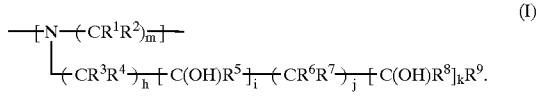

(I)

14 Claims, No Drawings

THERMOPLASTIC RESIN FILM SATISFACTORY IN PRINTABILITY

This application is a continuation of PCT/JP00/00594 filed Feb. 3, 2000.

TECHNICAL FIELD

The present invention relates to a thermoplastic resin film, and particularly to a thermoplastic resin film excellent in printability, which is obtained by conducting a specific oxidation treatment on a surface of a polyolefin film formed, and then, forming a coating film, the film having ink transfer, adhesion and aging stability, and being satisfactory in back ghost when offset printing using oxidation polymerization type ink is performed on both faces.

BACKGROUND ART

As stickers for outdoor advertisements and labels stuck on containers for frozen food, there has previously been used coated paper for paper for the stickers and the labels. However, the coated paper is poor in water resistance, so that one in which a surface of the coated paper is further covered with a polyester film has been used for reinforcing it.

In recent years, for applications requiring water resistance like this, synthetic paper of the polyolefin family satisfactory in water resistance has attracted attention as a hopeful material substituted for the above-mentioned polyester film-covered coated paper.

However, such synthetic paper of the polyolefin family is not necessarily satisfactory in printability and processability because of non-polarity of the polyolefin resin, a raw material therefor. It is therefore generally used after appropriate surface treatments have been conducted.

As one of such surface treatments, a method of applying a coating solution after an oxidation treatment has been conducted on a surface of a resin sheet is known, and as such an oxidation treatment method, a corona discharge treatment or a flame treatment is known. As the coating solution, specifically, the use of a cationic antistatic agent or an amphoteric antistatic agent is disclosed in JP-A-50-161478 (the term "JP-A" as used herein means an "unexamined published Japanese patent application"), JP-B-59-27769 (the term "JP-B" as used herein means an "examined Japanese patent publication"), JP-B-2-2910, etc. For example, JP-B-2-2910 discloses a water-soluble coating solution comprising a water-soluble polymer obtained by making quaternary a tertiary nitrogen atom of a polymer formed by $CH_2=CR^1$—$COOANR^3R^4$, $CH_2=CR^1$—$COOR^2$ and another hydrophobic vinyl monomer (in each formula, $R^1$ is a hydrogen atom or a methyl group, $R^2$ is an alkyl group having from 1 to 8 carbon atoms, $R^3$ and $R^4$ are each a hydrogen atom or an alkyl group having from 1 to 2 carbon atoms, and A is an alkylene group having from 2 to 6 carbon atoms) with a cationizing agent to convert it to a quaternary compound, a water-soluble polyaminepolyamide-epichlorohydrin adduct and a polyethyleneimine.

On the other hand, in JP-A-53-8380, there is described a conductive agent having an antistatic performance comprising a polymer having repeating units represented by the following general formula (II):

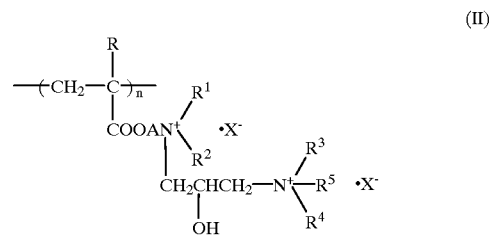

(in the formula, R represents a hydrogen atom or a methyl group, $R^1$ and $R^2$ each represents a methyl group or an ethyl group, $R^3$ and $R^4$ each represents a methyl group, an ethyl group, —$(-CH_2-CH_2-O-)_m$—H (m is an integer of from 1 to 4) or a benzyl group, $R^5$ represents an alkyl group having from 1 to 18 carbon atoms, an alkenyl group or —$(-CH_2-CH_2-O-)_p$—H (p is an integer of from 1 to 4), $X^-$ represents a halogen ion, A represents an alkylene group which may be substituted, and n usually represents an integer of from $10^1$ to $10^4$.)

Further, in each of JP-B-40-12302, JP-B-53-6676 and JP-A-57-149363, it is described that polyethyleneimine or an ethyleneimine-ethyleneurea copolymer is applied as a primer (coating agent). In particular, in JP-A-1-141736, it is disclosed that modified polyethyleneimine as represented by the following chemical formula is applied for obtaining transfer stability of ultraviolet curing type ink for a long period of time:

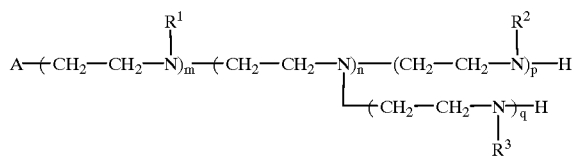

(in the formula, A represents —$NHR^4$ or a polyaminepolyamide residue, $R^1$ to $R^4$ are each independently a hydrogen atom, an alkyl or alkenyl group having from 1 to 24 carbon atoms, an aliphatic cyclic hydrocarbon group or a benzyl group, but at least one thereof is a group other than a hydrogen atom, m is from 0 to 300, and n, p and q are each from 1 to 300.)

However, such a surface oxidation treatment and the coating of the antistatic agent or the primer, particularly the above-mentioned alkyl, alkenyl and aliphatic hydrocarbon, or benzyl-modified polyethyleneimine provides printed matter which sufficiently fit for practical applications in printing using ultraviolet curing type ink. However, when offset printing using oxidation polymerization type ink is performed on both faces, printing of a back face several days after printing of a front face causes the occurrence of poor ink transfer from a pattern of the front face to a pattern of the back face, which sometimes exerts on the pattern of the back face such an influence that printed matter is difficult to fit for practical applications. This phenomenon is called back ghost.

An object of the invention is to provide a thermoplastic resin film excellent in printability, which has antistatic properties and water resistance, and generates no back ghost when double-face offset printing with oxidation polymerization type ink is performed.

DISCLOSURE OF THE INVENTION

The invention has discovered that the generation of the above-mentioned back ghost is improved by forming a specific hydroxy-modified imine polymer on a surface of a thermoplastic resin film.

That is to say, there is provided a thermoplastic resin film satisfactory in printability characterized by having on a surface thereof a hydroxy-modified imine polymer containing repeating units represented by the following general formula (I) in an amount of 5 mol % or more based on the total of repeating units:

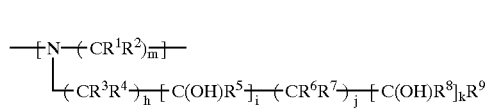

(I)

(in the formula, $R^1$ and $R^2$ are each independently a hydrogen atom, or a straight chain or branched alkyl group within the range of 1 to 10 carbon atoms, an alkyl group having an alicyclic structure or an aryl group, $R^3$, $R^4$, $R^5$, $R^6$, $R^7$, $R^8$ and $R^9$ are each independently a hydrogen atom, or an alkyl group within the range of 1 to 20 carbon atoms, a cycloalkyl group, an aryl group, an aralkyl group, an alkylaryl group, groups each alternately forming bonds to form a cyclic structure, an alkyloxyalkyl group having a straight chain, branched or alicyclic structure within the range of 1 to 20 carbon atoms, an alkylaryloxyalkyl group, a hydroxyalkyl group having a straight chain, branched or alicyclic structure within the range of 1 to 20 carbon atoms or an aryl group-containing hydroxyalkyl group, h is an integer ranging from 0 to 4, i is an integer ranging from 1 to 4, j is an integer ranging from 0 to 4, k is an integer ranging from 0 to 4 and m is an integer ranging from 2 to 6.)

In the film having the hydroxyimine copolymer on the surface thereof like this, volatile components generated in a drying process of ink after printing of the front face are poorly adsorbed by the back face of the sheet, when offset printing using oxidation polymerization type ink is performed, compared with a film obtained by coating and drying an aqueous solution containing the above-mentioned conventional alkyl-modified polyethyleneimine, and the ink transfer thereof is uniform in printing of the back face, which causes generation of no ghost. It becomes therefore possible to provide good printed matter.

BEST MODE FOR CARRYING OUT THE INVENTION

The invention is described in more detail below.
(I) Thermoplastic Resin Film Layers
(1) Raw Materials Thermoplastic resins used include polyolefin resins such as ethylene resins such as high density polyethylene and intermediate density polyethylene, polypropylene resins, polymethyl-1-pentene resins or ethylene-cyclic olefin copolymers, polyamide resins such as nylon-6, nylon-6,6, nylon-6,10 and nylon-6,12, thermoplastic polyester resins such as polyethylene terephthalate and its copolymers, polyethylene naphthalate and aliphatic polyesters, and thermoplastic resins such as polycarbonates, atactic polystyrene, syndiotactic polystyrene, polymethyl methacrylate, polyvinyl chloride, polyvinylidene chloride, ethylene-vinyl chloride copolymers and polyphenylene sulfide. They can also be used as a mixture of two or more of them.

Of these thermoplastic resins, for exhibiting the effect of the invention still more, it is preferable to use polyethylene terephthalate or copolymers thereof, mixtures of polypropylene, polystyrene, polymethyl-1-pentene resins and ethylene-cyclic olefin copolymers with them, or non-polar polyolefin resins. Further, of the polyolefin resins, propylene resins are preferred in terms of chemical resistance, cost, etc.

As such propylene resins, there are used isotactic or syndiotactic polypropylene and polypropylene having various steric regularities, which are propylene homopolymers, and copolymers of propylene as a main component with α-olefins such as ethylene, butene-1, hexane-1, heptane-1 and 4-methylpentene-1. These copolymers may be two-dimensional, three-dimensional or four-dimensional, and may be random copolymers or block copolymers.

Further, when the propylene homopolymers are used, it is preferred that resins lower in melting point than the propylene homopolymers, such as polyethylene and ethylene-vinyl acetate copolymers, are mixed therewith in an amount of 2 to 25% by weight, for improving stretchability.

The thermoplastic resin film may be a single layer, a two-layer structure consisting of a base material layer and a surface layer, a three-layer structure in which surface layers exist on the front and back of a base material layer, or a multi-layer structure in which other layers exist between a base material layer and a surface layer. Further, it may be one containing no fine inorganic powder or no organic filler, or containing the powder or filler.

When the thermoplastic resin film is the polyolefin resin film and the single layer, and contains the fine inorganic powder, it contains usually 40 to 99.5% by weight of the polyolefin resin and 60 to 0.5% by weight of the fine inorganic powder, and preferably 50 to 97% by weight of the polyolefin resin and 50 to 3% by weight of the fine inorganic powder. When the thermoplastic resin film is the multi-layer structure and the base material layer and the surface layer contain the fine inorganic powder, usually, the base material layer contains 40 to 99.5% by weight of the polyolefin resin and 60 to 0.5% by weight of the fine inorganic powder, and the surface layer contains 25 to 100% by weight of the polyolefin resin and 75 to 0% by weight of the fine inorganic powder. Preferably, the base material layer contains 50 to 97%by weight of the polyolefin resin and 50 to 3% by weight of the fine inorganic powder, and the surface layer contains 30 to 97% by weight of the polyolefin resin and 70 to 3% by weight of the fine inorganic powder.

When the fine inorganic powder contained in the base material layer of the single-layer structure or the multi-layer structure exceeds 60% by weight, a stretched resin film is liable to break in transverse stretching performed after longitudinal stretching. When the fine inorganic powder contained in the surface layer exceeds 75% by weight, the surface strength of the surface layer after transverse stretching is low, resulting in material fracture of the surface layer in color development of printing ink.

In applications such as offset printing, etc., the fine inorganic powder drops off from opening voids of the surface (this is called paper powder), which causes troubles of stains on a blanket cylinder and contamination of printing ink to decrease continuous printability. For such applications, it is preferred that a resin at least 5° C. higher in melting point than the resin used for the base material is used for the surface layer, because the amount of paper powder can be decreased.

As the fine inorganic powders, there are used calcium carbonate, calcined clay, silica, diatomaceous earth, talc, titanium oxide, barium sulfate, alumina, etc., whose average particle size is from 0.01 to 15 μm.

When the thermoplastic resin film is the polyolefin resin film, as the organic filler, there is used one having a melting point (for example, from 170 to 300° C.) or a glass transition temperature (for example, from 170 to 280° C.) higher than the melting point of the polyolefin resin, such as polyethylene terephthalate, polybutylene terephthalate, a polycarbonate, nylon-6, nylon-6,6, nylon-6,12 or a cyclic olefin polymer. When the thermoplastic resin film is the polyolefin resin film and the single layer, and contains the organic filler, it contains usually 50 to 99.5% by weight of the polyolefin resin and 50 to 0.5% by weight of the organic filler, and preferably 60 to 97% by weight of the polyolefin resin and 40 to 3% by weight of the organic filler. When the thermoplastic resin film is the multi-layer structure and the base material layer and the surface layer contain the organic filler, usually, the base material layer contains 50 to 99.5% by weight of the polyolefin resin and 50 to 0.5% by weight of the organic filler, and the surface layer contains 35 to 100% by weight of the polyolefin resin and 65 to 0% by weight of the organic filler. Preferably, the base material layer contains 60 to 97% by weight of the polyolefin resin and 40 to 3% by weight of the organic filler, and the surface layer contains 40 to 97% by weight of the polyolefin resin and 60 to 3% by weight of the organic filler.

A stabilizer, a light stabilizer, a dispersing agent, a lubricant, etc. may be further mixed therewith as needed. As the stabilizer, there may be mixed a stabilizer of the steric hindrance phenol family, the phosphorus family, the amine family, etc. in an amount of 0.001 to 1% by weight. As the light stabilizer, there may be mixed a light stabilizer of a steric hindrance amine, the benzotriazole family, the benzphenone family, etc. in an amount of 0.001 to 1% by weight. As the dispersing agent for the fine inorganic powder, there may be mixed, for example, a silane coupling agent, a higher fatty acid such as oleic acid or stearic acid, metal soap, polyacrylic acid, polymethacrylic acid or a salt thereof in an amount of 0.01 to 4% by weight.

(2) Formation of Resin Films

There is no particular limitation on methods for forming the thermoplastic resin films, and various known methods can be used. Specific examples thereof include cast molding in which a molten resin is extruded in the film form using a single-layer or multi-layer T die or I die connected to a screw type extruder, calender molding, rolling molding, inflation molding, a method by removal of a solvent or an oil after cast molding or calender molding of a mixture of a thermoplastic resin and the organic solvent or the oil, a method by forming from a solution of a thermoplastic resin and removal of a solvent, and film forming by laminating at least one surface of a thermoplastic resin film, pulp paper or non-woven fabric, using melt lamination or an adhesive.

When the films are stretched, various known methods can be used. Specific examples thereof include longitudinal stretching utilizing the difference in peripheral speed between a group of rolls and transverse stretching using a tenter oven.

Specifically, the stretching can be carried out within the known temperature range suitable for each thermoplastic resin, higher than the glass transition temperature of the thermoplastic resin used, in the case of an amorphous resin, and from the glass transition temperature of an amorphous portion to the melting point of a crystalline portion, in the case of a crystalline resin. The stretching includes longitudinal stretching utilizing the difference in peripheral speed between a group of rolls, transverse stretching using a tenter oven, rolling, and simultaneous biaxial stretching by a combination of a tenter oven and a linear motor. Two or more of these methods may be combined. Of these, sequential biaxial stretching in which transverse stretching is performed after longitudinal stretching is suitable.

Specifically, production examples of the base material resin films are mentioned.

A resin composition for the base material layer is melt kneaded, and this is extruded in the sheet form and longitudinally stretched utilizing the difference in speed between a group of rolls. Then, at least one face of this longitudinally stretched film is laminated with a melt-kneaded resin composition for the surface layer in the sheet form. Then, this is transversely stretched, followed by heat treatment and cooling, thereby obtaining the resin film.

There is no particular limitation on the stretching ratio, and it is appropriately selected depending on the purpose and the characteristics of the thermoplastic resin used. Giving examples, when the propylene homopolymer or the copolymer thereof is used as the thermoplastic resin, it is from about 1.2 to 12 times, and preferably from 2 to 10 times, for unidirectional stretching, and it is from 1.5 to 60 times, and preferably from 10 to 50 times, by area ratio, for biaxial stretching. When at hermoplastic resin other than the propylene homopolymer or the copolymer thereof is used, it is from 1.2 to 10 times, and preferably 2 to 5 times, for unidirectional stretching, and it is from 1.5 to 20 times, and preferably from 4 to 12 times, by area ratio, for biaxial stretching. Further, heat treatment at high temperature is conducted as needed.

The stretching temperature is a temperature 2 to 150° C. lower than the melting point of the thermoplastic resin used. When the resin is the propylene homopolymer (melting point: 155 to 167° C.), it is from 120 to 165° C. In the case of high density polyethylene (melting point: 121 to 134° C.), it is from 80 to 120° C., and in the case of polyethylene terephthalate (melting point: 246 to 252° C.), it is preferably from 104 to 115° C. Further, the stretching speed is from 20 to 350m/minute.

The thickness of the thermoplastic resin film after stretching is from 20 to 350 μm, and preferably from 35 to 300 μm.

The most suitable base material resin film is a structure of two or more layers comprising the surface layer and the base material layer, and the surface layer is a uniaxial stretched film and the base material layer is a biaxial stretched film. The uniaxial stretched product is a uniaxial stretched film of the propylene copolymer or high density polyethylene (density: 0.945 to 0.970 g/cm$^3$) containing the fine inorganic powder having an average particle size of 0.01 to 5 μm, preferably 0.05 to 3 μm in an amount of 8 to 65 % by weight, preferably 15 to 55 % by weight, and having a melting point (a peak temperature of a DSC curve) of 120 to 160° C. and a melting point 5° C. or more lower than the melting point of the olefin copolymer of the base material layer. The surface of this fine inorganic powder is covered with the propylene copolymer or high density polyethylene, and the surface roughness Ra (JIS B0602) of this uniaxial stretched film is from 0.3 to 1.5 μm.

(3) Physical Properties of Films after Stretching

The thermoplastic resin films after stretching have the following physical properties: a density of 0.65 to 1.2 g/cm$^3$, an opacity of 20% or more, preferably 75% or more, and a Beck smoothness of 50 to 25,000 seconds. In the invention, the thermoplastic resin films are preferably porous stretched resin films. The stretched porous resin films are ones whose porosity calculated by the following formula is from 8 to 50%:

$$\text{Porosity } (\%) = (\rho_0 - \rho)/\rho_0 \times 100$$

$\rho_0$: A density of a resin film before stretching
$\rho$: A density of a resin film after stretching (II) Surface Oxidation Treatments The surface oxidation treatments of the above-mentioned base resin films include a corona discharge treatment, a flame treatment, a plasma treatment, a glow discharge treatment, an ozone treatment and a chemical treatment, and preferred are a corona discharge treatment and a flame treatment. The treating amount used is from 10 to 200 W·minute/m² (from 600 to 12,000 J/m²) and preferably from 20 to 180 W·minute/m² (from 1,200 to 10,800 J/m²), for the corona treatment, and from 8,000 to 200,000 J/m² and preferably from 10,000 to 150,000 J/m², for the flame treatment.

(III) Surface Treating Agents (1) Hydroxy-Modified Imine Polymers {Component (A)}

The hydroxy-modified imine polymers used in the invention is ones each containing a structure represented by the following general formula (I) in an amount of 5 mol % or more based on the total of repeating units. They are hereinafter referred to as component (A) for brevity.

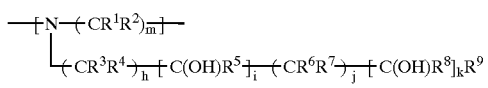
(I)

(in the formula, $R^1$ and $R^2$ are each independently a hydrogen atom, or a straight chain or branched alkyl group within the range of 1 to 10 carbon atoms, an alkyl group having an alicyclic structure or an aryl group, $R^3$, $R^4$, $R^5$, $R^6$, $R^7$, $R^8$ and $R^9$ are each independently a hydrogen atom, or an alkyl group having from 1 to 20 carbon atoms, a cycloalkyl group, an aryl group, an aralkyl group, an alkylaryl group, groups each alternately forming bonds to form a cyclic structure, an alkyloxyalkyl group having a straight chain, branched or alicyclic structure within the range of 1 to 20 carbon atoms, an alkylaryloxyalkyl group, a hydroxyalkyl group having a straight chain, branched or alicyclic structure within the range of 1 to 20 carbon atoms or an aryl group-containing hydroxyalkyl group, h is an integer ranging from 0 to 4, i is an integer ranging from 1 to 4, j is an integer ranging from 0 to 4, k is an integer ranging from 0 to 4 and m is an integer ranging from 2 to 6.)

Specific examples of $R^1$ and $R^2$ of general formula (I) include hydrogen, methyl, ethyl, propyl, 1-methylethyl, butyl, 1-methylpropyl, pentyl, 1-methylbutyl, hexyl, octyl, 1-methyl-1-ethylpentyl, nonyl, 1-methyloctyl, decyl, cyclopentyl, cyclohexyl, cycloheptyl, cyclooctyl, phenyl, tolyl, benzyl, etc., and preferred are hydrogen, methyl and ethyl. More preferably, one of $R^1$ and $R^2$ is hydrogen, and the other is methyl, or both are hydrogen. Still more preferably, both of $R^1$ and $R^2$ are hydrogen.

Specific examples of $R^3$, $R^4$, $R^5$, $R^6$, $R^7$, $R^8$ and $R^9$ include hydrogen, methyl, ethyl, propyl, 1-methylethyl, butyl, 1-methylpropyl, t-butyl, pentyl, 1-methylbutyl, 1-ethylpropyl, hexyl, octyl, 2-ethylhexyl, nonyl, 1-methyloctyl, decyl, cyclopentyl, cyclohexyl, cycloheptyl, cyclooctyl, norbornyl, phenyl, tolyl, benzyl, methoxy, ethoxy, 1-propoxy, 1-methylethoxy, 1-butoxy, 1-methylpropoxy, trimethylmethoxy, 1-pentyloxy, 1-methylbutoxy, 1-ethylpropoxy, 1-hexyloxy, 1-methylpentoxy, 1-ethylbutoxy, 1-heptyloxy, 1-methylhexyloxy, 1-octyloxy, 1-methylheptyloxy, 1-ethylheptyloxy, 1-propylpentyloxy, 1-nonyloxy, 1-methyloctyloxy, 1-ethylheptyloxy, 1-propylhexyloxy, 1-decyloxy, 1-methylnonyloxy, 1-ethyloctyloxy, 1-propylheptyloxy, 1-butylhexyloxy, 1-undecyloxy, 1-methyldecyloxy, 1-ethylnonyloxy, 1-propyloctyloxy, 1-dodecyloxy, 1-methylundecyloxy, 1-ethyldecyloxy, 1-propylnonyloxy, 1-tridecyloxy, 1-methyldodecyloxy, 1-ethylundecyloxy, 1-propyldecyloxy, 1-butylnonyloxy, 1-heptyloctyloxy, stearyloxy, phenoxy, benzyloxy, p-ethylphenoxy, tolyloxy, cyclopentyloxy, cyclohexyloxy, norbornyloxy, hydroxymethyl, 1-hydroxyethyl, 2-hydroxyethyl, 1-methyl-1-hydroxyethyl, 1-hydroxypropyl, 2-hydroxypropyl, 3-hydroxypropyl, 1-hydroxymethylpropyl, 1-methyl-1-hydroxypropyl, 2-methyl-1-hydroxypropyl, 1-methyl-2-hydroxypropyl, 2-methyl-2-hydroxypropyl, 1-methyl-3-hydroxypropyl, 2-methyl-3-hydroxypropyl, 1-hydroxybutyl, 2-hydroxybutyl, 3-hydroxybutyl; 4-hydroxybutyl, 1-hydroxypentyl, 2-hydroxypentyl, 3-hydroxypentyl, 4-hydroxypentyl, 5-hydroxypentyl, 1-hydroxyhexyl, 2-hydroxyhexyl, 3-hydroxyhexyl, 4-hydroxyhexyl, 5-hydroxyhexyl, 6-hydroxyhexyl, 1-hydroxyheptyl, 2-hydroxyheptyl, 3-hydroxyheptyl, 4-hydroxyheptyl, 5-hydroxyheptyl, 6-hydroxyheptyl, 7-hydroxyheptyl, 1-hydroxyoctyl, 2-hydroxyoctyl, 3-hydroxyoctyl, 4-hydroxyoctyl, 5-hydroxyoctyl, 6-hydroxyoctyl, 7-hydroxyoctyl, 8-hydroxyoctyl, 1-hydroxynonyl, 2-hydroxynonyl, 3-hydroxynonyl, 4-hydroxynonyl, 5-hydroxynonyl, 6-hydroxynonyl, 7-hydroxynonyl, 8-hydroxynonyl, 9-hydroxynonyl, 1-hydroxydecyl, 2-hydroxydecyl, 3-hydroxydecyl, 4-hydroxydecyl, 5-hydroxydecyl, 6-hydroxydecyl, 7-hydroxydecyl, 8-hydroxydecyl, 9-hydroxydecyl, 10-hydroxydecyl, 1-hydroxyundecyl, 2-hydroxyundecyl, 11-hydroxydodecyl, 12-hydroxydodecyl, 1-hydroxystearyl, 2-hydroxystearyl, 3-hydroxystearyl, 4-hydroxystearyl, 16-hydroxystearyl, 12-hydroxystearyl, phenylhydroxymethyl, 1-hydroxy-1-phenylethyl, 1-hydroxy-2-phenylethyl, 2-hydroxy-1-phenylethyl, 2-hydroxy-2-phenylethyl, 1-hydroxycyclopentyl, 2-hydroxycyclopentyl, 3-hydroxycyclopentyl, 1-hydroxycyclohexyl, 2-hydroxycyclohexyl, 3-hydroxycyclohexyl, 4-hydroxycyclohexyl, 1-hydroxycyclopentylmethyl, 2-hydroxycyclopentylmethyl, 3-hydroxycyclopentylmethyl, 4-hydroxycyclopentylmethyl, 2-hydroxy-2-cyclopentylethyl, 2-hydroxy-1-cyclopentylethyl, 1-hydroxycyclohexylmethyl, 2-hydroxycyclohexylmethyl, 3-hydroxycyclohexylmethyl, 4-hydroxycyclohexylmethyl, 2-hydroxy-2-cyclohexylethyl, 2-hydroxy-1-cyclohexylethyl, 1,2-dihydroxyethyl, 1,2-dihydroxypropyl, 2,3-dihydroxypropyl, 1,3-dihydroxypropyl, 1,2,3-trihydroxypropyl, hydroxymethyl-1,2-dihydroxyethyl, 1,2-dihydroxybutyl, 1,3-dihydroxybutyl, 1,4-dihydroxybutyl, 2,3-dihydroxybutyl, 2,4-dihydroxybutyl, 3,4dihydroxybutyl, 1-methyl-2,3-dihydroxypropyl, 1-hydroxymethyl-2-hydroxypropyl, 1-methyl-1,2,3-trihydroxypropyl, 2,3,4-trihydroxybutyl, 1-hydroxymethyl-2,3-dihydroxypropyl, 1,2,3,4-tetrahydroxybutyl, 1-hydroxymethyl-1,2,3-trihydroxypropyl, 1,2-dihydroxypentyl, 1,3-dihydroxypentyl, 1,4-dihydroxypentyl, 1,5-dihydroxypentyl, 2,3-dihydroxypentyl, 2,4-dihydroxypentyl, 2,5-dihydroxypentyl, 3,4-dihydroxypentyl, 3,5-dihydroxypentyl, 4,5-dihydroxypentyl, 1-hydroxymethyl-1-hydroxybutyl, 1-hydroxymethyl-2-hydroxybutyl, 1-hydroxymethyl-3-hydroxybutyl, 1-hydroxymethyl-4-hydroxybutyl, 1-methyl-1,2-dihydroxybutyl, 1-methyl-1,3-dihydroxybutyl, 1-methyl-1,4-dihydroxybutyl, 1-methyl-2,3-dihydroxybutyl, 1-methyl-2,4-dihydroxybutyl, 1-methyl-3,4-dihydroxybutyl, 1-ethyl-2,3-dihydroxypropyl, 1-ethyl-1,3-dihydroxypropyl, 1-hydroxyethyl-3-dihydroxypropyl, 2-hydroxyethyl-3-hydroxypropyl, 1-hydroxyethyl-2- dihydroxypropyl, 2-hydroxyethyl-2-hydroxypropyl, 1,2,3-trihydroxypentyl, 1,2,4-trihydroxypentyl, 1,2,5-trihydroxypentyl, 2,3,4-trihydroxypentyl, 2,3,5-trihydroxypentyl, 3,4,5-trihydroxypentyl, 1-hydroxymethyl-1,2-dihydroxybutyl, 1-hydroxymethyl-1,3-dihydroxybutyl, 1-hydroxymethyl-1,4-dihydroxybutyl, 1-hydroxymethyl-2,3-dihydroxybutyl, 1-hydroxymethyl-2,4-dihydroxybutyl, 1-hydroxymethyl-3,4-dihydroxybutyl, 1-methyl-1,2,3-trihydroxybutyl, 1-methyl-1,2,4-trihydroxybutyl, 1-methyl-2,3,4-trihydroxybutyl, i-ethyl-1,2,3-trihydroxypropyl, 1-hydroxyethyl-2,3-dihydroxypropyl, 2-hydroxyethyl-2,3-dihydroxypropyl, 2-hydroxyethyl-1,2-dihydroxypropyl, 2-hydroxyethyl-1,3-dihydroxypropyl, 1-hydroxyethyl-1,2-dihydroxypropyl, 1,2,3,4-tetrahydroxypentyl, 1,2,3,5-tetrahydroxypentyl, 1,2,4,5-tetrahydroxypentyl, 1,3,4,5-tetrahydroxypentyl, 2,3,4,5-tetrahydroxypentyl, 1-hydroxymethyl-1,2,3-trihydroxybutyl, 1-hydroxymethyl-1,2,4-trihydroxybutyl, 1-hydroxymethyl-1,3,4-trihydroxybutyl, 1-hydroxymethyl-2,3,4-trihydroxybutyl, methyl-1,2,3,4-tetrahydroxybutyl, 1-hydroxyethyl-1,2,3-trihydroxypropyl, ethyl-1,2,3-trihydroxypropyl, 1,2-dihydroxyethyl-1,2-dihydroxybutyl, 1,2,3,4,5-pentahydroxypentyl, 1-hydroxymethyl-1,2,3,4-tetrahydroxybutyl, 1,2-diethyl-1,2,3-trihydroxypropyl, 1,2-dihydroxyhexyl, 1,3-dihydroxyhexyl, 1,4-dihydroxyhexyl, 1,5-dihydroxyhexyl, 1,6-dihydroxyhexyl, 2,3-dihydroxyhexyl, 2,3-dihydroxyhexyl, 2,4-dihydroxyhexyl, 2,5-dihydroxyhexyl, 2,6-dihydroxyhexyl, 3,4-dihydroxyhexyl, 3,5-dihydroxyhexyl, 3,6-dihydroxyhexyl, 4,5-dihydroxyhexyl, 4,6-dihydroxyhexyl, 5,6-dihydroxyhexyl, 1-hydroxymethyl-1-hydroxyheptyl, 1-hydroxymethyl-2-hydroxyheptyl, 1-hydroxymethyl-3-hydroxyheptyl, 1-hydroxy-4-hydroxyheptyl, 1-hydroxymethyl-5-hydroxyheptyl, 1-methyl-1,2-dihydroxyheptyl, 1-methyl-1,3-dihydroxyheptyl, 1-methyl-1,4-dihydroxyheptyl, 1-methyl-1,5-dihydroxyheptyl, 1-methyl-2,3-dihydroxyheptyl, 1-methyl-2,4-dihydroxyheptyl, 1-methyl-2,5-dihydroxyheptyl, 1-methyl-3,4-dihydroxyheptyl, 1-methyl-3,5-dihydroxyheptyl, 1-methyl-4,5-dihydroxyheptyl, 1,2-dihydroxyethylbutyl, 2-hydroxyethyl-1-hydroxybutyl, 2-hydroxyethyl-2-hydroxybutyl, 2-hydroxyethyl-3-hydroxybutyl, 2-hydroxyethyl-4-hydroxybutyl, 1-hydroxyethyl-1-hydroxybutyl, 1-hydroxyethyl-2-hydroxybutyl, 1-hydroxyethyl-3-hydroxybutyl, 1-hydroxyethyl-4-hydroxybutyl, 1-ethyl-1,2-dihydroxybutyl, 1-methyl-1,3-dihydroxybutyl, 1-ethyl-1,4-dihydroxybutyl, 1-ethyl-2,3-dihydroxybutyl, 1-ethyl-2,4-dihydroxybutyl, 1-ethyl-3,4-dihydroxybutyl, 1,2,3-trihydroxyhexyl, 1,2,4-trihydroxyhexyl, 1,2,5-trihydroxyhexyl, 1,2,6-trihydroxyhexyl, 1,3,4-trihydroxyhexyl, 1,3,5-trihydroxyhexyl, 1,3,6-trihydroxyhexyl, 1,4,5-trihydroxyhexyl, 1,4,6-trihydroxyhexyl, 1,5,6-trihydroxyhexyl, 2,3,4-trihydroxyhexyl, 2,3,5-trihydroxyhexyl, 2,3,6-trihydroxyhexyl, 2,4,5-trihydroxyhexyl, 2,4,6-trihydroxyhexyl, 2,5,6-trihydroxyhexyl, 3,4,5-trihydroxyhexyl, 3,4,6-trihydroxyhexyl, 3,5,6-trihydroxyhexyl, 4,5,6-trihydroxyhexyl, 1-hydroxymethyl-1,2-dihydroxyheptyl, 1-hydroxymethyl-1,3-dihydroxypentyl, 1-hydroxymethyl-1,4-dihydroxyheptyl, 1-hydroxymethyl-1,5-dihydroxypentyl, 1-hydroxymethyl-2,3-dihydroxypentyl, 1-hydroxymethyl-2,4-dihydroxypentyl, 1-hydroxymethyl-2,5-dihydroxypentyl, 1-hydroxy-methyl-3,4-dihydroxypentyl, 1-hydroxymethyl-3,5-dihydroxyheptyl, 1-hydroxymethyl-4,5-dihydroxyheptyl, 1-methyl-1,2,3-trihydroxypentyl, 1-methyl-1,2,4-trihydroxypentyl, 1-methyl-1,2,5-trihydroxypentyl, 1-methyl-2,3,4-trihydroxypentyl, 1-methyl-2,3,5-trihydroxypentyl, 1-methyl-3,4,5-trihydroxypentyl, 1,2-dihydroxyethyl-l-hydroxybutyl, 1,2-dihydroxyethyl-2-hydroxybutyl, 1,2-dihydroxyethyl-3-hydroxybutyl, 1,2-dihydroxyethyl-4-hydroxybutyl, 2-hydroxyethyl-1,2-dihydroxybutyl, 2-hydroxyethyl-1,3-dihydroxybutyl, 2-hydroxyethyl-1,4-dihydroxybutyl, 2-hydroxyethyl-2,3-dihydroxybutyl, 2-hydroxyethyl-2,4-dihydroxybutyl, 2-hydroxyethyl-3,4-dihydroxybutyl, 1-hydroxyethyl-1,2-dihydroxybutyl, 1-hydroxyethyl-1,3-dihydroxybutyl, 1-hydroxyethyl-1,4-dihydroxybutyl, ethyl-1,2,3-trihydroxybutyl, ethyl-1,2,4-trihydroxybutyl, ethyl-2,3,4-trihydroxybutyl, 1,2,3,4-tetrahydroxyhexyl, 1,2,3,4-tetrahydroxyhexyl, 1,2,3,5-tetrahydroxyhexyl, 1,2,3,6-tetrahydroxyhexyl, 1,2,4,5-tetrahydroxyhexyl, 1,2,4,6-tetrahydroxyhexyl, 1,3,4,5-tetrahydroxyhexyl, 1,2,4,6-tetrahydroxyhexyl, 1,3,4,5-tetrahydroxyhexyl, 1,3,4,6-tetrahydroxyhexyl, 1,3,5,6-tetrahydroxyhexyl, 2,3,4,5-tetrahydroxyhexyl, 2,3,4,6-tetrahydroxyhexyl, 2,3,5,6-tetrahydroxyhexyl, 2,4,5,6-tetrahydroxyhexyl, 3,4,5,6-tetrahydroxyhexyl, 1-hydroxymethyl-1,2,3-trihydroxyheptyl, 1-hydroxymethyl-1,2,4-trihydroxyheptyl, 1-hydroxymethyl-1,3,4-trihydroxyheptyl, 1-hydroxymethyl-1,3,5-trihydroxyheptyl, 1-hydroxymethyl-1,4,5-trihydroxyheptyl, 1-hydroxymethyl-2,3,4-tri-hydroxyheptyl, 1-hydroxymethyl-2,3,5-trihydroxyheptyl, 1-hydroxymethyl-2,4,5-trihydroxyheptyl, methyl-1,2,3,4-tetrahydroxyheptyl, 1-methyl-1,2,3,5-tetrahydroxypentyl, 1-methyl-1,2,4,5-tetrahydroxypentyl, 1-methyl-2,3,4,5-tetrahydroxypentyl, 1,2-dihydroxyethyl-1,2-dihydroxybutyl, 1,2-dihydroxy-1,3-dihydroxybutyl, 1,2-dihydroxyethyl-1,4-dihydroxybutyl, 1,2-dihydroxyethyl-2,3-dihydroxybutyl, 1,2-dihydroxyethyl-2,4-dihydroxybutyl, 1,2-dihydroxyethyl-3,4-dihydroxybutyl, 2-hydroxyethyl-1,2,3-trihydroxybutyl, 2-hydroxyethyl-1,2,4-trihydroxybutyl, 2-hydroxyethyl-1,3,4-trihydroxybutyl, 2-hydroxyethyl-2,3,4-trihydroxybutyl, 1-hydroxyethyl-1,2,3-trihydroxybutyl, 1-hydroxyethyl-1,2,4-trihydroxybutyl, 1-hydroxyethyl-1,3,4-trihydroxybutyl, 1-hydroxyethyl-2,3,4-trihydroxybutyl, ethyl-1,2,3,4-tetrahydroxybutyl, 2,3,4,5,6-pentahydroxyhexyl, 1-hydroxymethyl-1,2,3,4-tetrahydroxypentyl, 1-methyl-1,2,3,4,5-pentahydroxypentyl, 1,2-dihydroxyethyl-1,2,3-trihydroxybutyl, 1-hydroxymethyl-1,2,3,4-tetrahydroxybutyl, 1,2-dihydroxycyclohexyl, 1,3-dihydroxycyclohexyl, 1,4-dihydroxycyclohexyl, 2,3-dihydroxycyclohexyl, 2,4-dihydroxycyclohexyl, 2,5-dihydroxycyclohexyl, 2,6-dihydroxycyclohexyl, 3,4-dihydroxycyclohexyl, 3,5-dihydroxycyclohexyl, 2,3-bishydroxymethylcyclohexyl, 2,4-bishydroxymethylcyclohexyl, 2,5-bishydroxymethylcyclohexyl, 2,6-bishydroxymethylcyclohexyl, 3,4-bishydroxymethylcyclohexyl, 3,5-bishydroxymethylcyclohexyl, 2-methoxy-1-hydroxyethyl, 1-methoxy-2-hydroxyethyl, 2-ethoxy-1-hydroxyethyl, 1-ethoxy-2-hydroxyethyl, 1-(2-hydroxyethoxy)methyl, 1-(2-hydroxyethoxy)ethyl, 2-(2-hydroxyethoxy)ethyl, 1-(2-hydroxyethoxy)propyl, 2-(2-hydroxyethoxy)propyl, 3-(2-hydroxyethoxy)propyl, 1-(2-hydroxyethoxy)butyl, 2-(2-hydroxyethoxy)butyl, 3-(2-hydroxyethoxy)butyl, 4-(2-hydroxyethoxy)butyl, 2-hydroxy-1-(2-hydroxyethoxy)ethyl, 1-hydroxy-2-(2-hydroxyethoxy)ethyl, 1,2-di(2-hydroxyethoxy)ethyl, 1-(2-hydroxypropoxy)methyl, 1-(2-hydroxypropoxy)ethyl, 2-(2-hydroxypropoxy)ethyl, 1-(2-hydroxypropoxy)propyl, 2-(2-hydroxypropoxy)propyl, 3-(2-hydroxypropoxy)propyl, 1-(2-hydroxypropoxy)butyl, 2-(2-hydroxypropoxy)butyl, 3-(2-hydroxypropoxy)butyl, 4-(2-hydroxypropoxy)butyl, 2-hydroxy-1-(2-hydroxypropoxy)ethyl, 1-hydroxy-2-(2-hydroxypropoxy)ethyl, 1,2-di(2-hydroxypropoxy)ethyl, 1-(3-hydroxypropoxy)methyl, 1-(3-hydroxypropoxy) ethyl, 2-(3-hydroxypropoxy)ethyl, 1-(3-hydroxypropoxy)propyl, 2-(3-hydroxypropoxy)propyl, 3-(3-hydroxy-propoxy)propyl, 1-(3-hydroxypropoxy)butyl, 2-(3-hydroxy-propoxy) butyl, 3-(3-hydroxypropoxy)butyl, 4-(3-hydroxypropoxy)butyl, 2-hydroxy-1-(3-hydroxypropoxy)ethyl, 2-hydroxy-1-(3-hydroxypropoxy)ethyl, 1,2-di(3-hydroxypropoxy) ethyl, 1-(3-hydroxy-2-propoxy)methyl, 1-(3-hydroxy-2-propoxy) ethyl, 2-(3-hydroxy-2-propoxy)ethyl, 1-(3-hydroxy-2-propoxy)propyl, 2-(3-hydroxy-2-propoxy)propyl, 3-(3-hydroxy-2-propoxy)propyl, 1-(3-hydroxy-2-propoxy)butyl, 2-(3-hydroxy-2-propoxy)butyl, 3-(3-hydroxy-2-propoxy) butyl, 4-(3-hydroxy-2-propoxy)butyl, 1-(3-hydroxy-2-propoxy)butyl, 2-hydroxy-1-(3-hydroxy-2-propoxy)ethyl, 1-hydroxy-2-(3-hydroxy-2-propoxy)ethyl, 1,2-di(3-hydroxy-2-propoxy)ethyl, 1-methoxy-2-hydroxypropyl, 1-methoxy-3-hydroxypropyl, 3-methoxy-1-hydroxypropyl, 2-methoxy-1-hydroxypropyl, 2-methoxy-3-hydroxypropyl, 3-methoxy-2-hydroxypropyl, 1-methyl-2-methoxy-1-hydroxyethyl, methoxymethyl-2-hydroxyethyl, 1-methyl-1-methoxy-2-hydroxyethyl, 1-ethoxy-2-hydroxypropyl, 1-ethoxy-3-hydroxypropyl, 3-ethoxy-1-hydroxypropyl, 2-ethoxy-1-hydroxypropyl, 2-ethoxy-3-hydroxypropyl, 3-ethoxy-2-hydroxypropyl, 2-ethoxy-1-methyl-1-hydroxyethyl, 1-ethoxymethyl-2-hydroxyethyl, 1-methyl-1-ethoxy-2-hydroxyethyl, 2-ethoxy-1-methyl-1-hydroxyethyl, 1-(2-hydroxyethoxy)-2-hydroxypropyl, 1-(2-hydroxyethoxy)-3-hydroxypropyl, 3-(2-hydroxyethoxy)-1-hydroxy-2-(2-hydroxyethoxy)-1-hydroxypropyl, 2-(2-hydroxyethoxy)-3-hydroxypropyl, 3-(2-hydroxyethoxy-methyl)-2-hydroxypropyl, 2-(2-hydroxyethoxy)-1-methyl-1-hydroxyethyl, 1-(2-hydroxyethoxymethyl)-2-hydroxyethyl, 1-methyl-1-(2-hydroxyethoxy)-2-hydroxyethyl, 1-(2-hydroxy-20 propoxy)-2-hydroxypropyl, 1-(2-hydroxypropoxy)-3-hydroxypropyl, 3-(2-hydroxypropoxy)-1-hydroxypropyl, 2-(2-hydroxypropoxy)-1-hydroxypropyl, 2-(2-hydroxypropoxy)-3-hydroxypropyl, 3-(2-hydroxypropoxy)-2-hydroxypropyl, 2-(2-hydroxypropoxy)-1-methyl-1-hydroxyethyl, 1-(2-hydroxypropoxymethyl)-1-hydroxyethyl, 1-(2-hydroxypropoxy)-2-methyl-2-hydroxyethyl, 1,2-dimethoxy-3-hydroxypropyl, 1,3-dimethoxy-2-hydroxypropyl, 2,3-dimethoxy-1-hydroxypropyl, 1-methoxymethyl-1-methoxy-2-hydroxyethyl, 1-methoxymethyl-2-methoxy-1-hydroxyethyl, 1,2-diethoxy-3-hydroxypropyl, 1,3-diethoxy-2-hydroxypropyl, 2,3-diethoxy-1-hydroxypropyl, 1-ethoxymethyl-1-ethoxy-2-hydroxyethyl, 1-ethoxymethyl-2-ethoxy-1-hydroxyethyl, 1,2-di(2-hydroxy-ethoxy)-3-hydroxypropyl, 1,3-di-(2-hydroxyethoxy)-2-hydroxypropyl, 2,3-di(2-hydroxyethoxy)-1-hydroxypropyl, 1-hydroxymethyl-1,2-di(2-hydroxyethoxy)ethyl, 1-hydroxyethoxymethyl-2-hydroxyethoxy-1-hydroxyethyl, 1,3-dihydroxy-2-methoxypropyl, 1,2-dihydroxy-3-methoxypropyl, 2,3-dihydroxy-1-methoxypropyl, 1,3-dihydroxy-2-methoxy-2-propyl, 1,2-dihydroxy-3-methoxy-2-propyl, 2,3-dihydroxy-1-methoxy-2-propyl, 1,3-dihydroxy-2-ethoxypropyl, 1,2-dihydroxy-3-ethoxypropyl, 2,3-dihydroxy-1-methoxypropyl, 1-hydroxymethyl-1-methoxy-2-hydroxyethyl, 1-methoxy-1,2-dihydroxyethyl, 1,3-dihydroxy-2-(2-hydroxyethoxy)propyl, 1,2-dihydroxy-3-(2-hydroxyethoxy)propyl, 2,3-dihydroxy-1-(2-hydroxyethoxy) propyl, 1-hydroxy-1-(2-hydroxyethoxy)-2-hydroxyethyl, 1-(2-hydroxyethoxymethyl)-1,2-dihydroxyethyl, methoxymethyl, ethoxymethyl, 1-propoxymethyl, 2-propoxymethyl, 1-butoxymethyl, 2-butoxymethyl, t-butoxymethyl, 1-pentyloxymethyl, 2-pentyloxymethyl, 3-pentyloxymethyl, 1-hexyloxymethyl, 2-hexyloxymethyl, 3-hexyloxymethyl, 1-heptyloxymethyl, 2-heptyloxymethyl, 1-octyloxymethyl, 2-octyloxymethyl, 3-octyloxymethyl, 4-octyloxymethyl, 1-nonyloxymethyl, 2-nonyloxymethyl, 3-nonyloxymethyl, 4-nonyloxymethyl, 1-decyloxymethyl, 2-decyloxymethyl, 3-decyloxymethyl, 4-decyloxymethyl, 5-decyloxymethyl, 1-undecyloxymethyl, 1-undecyloxymethyl, 2-undecyloxymethyl, 3-undecyloxymethyl, 4-undecyloxymethyl, 1-dodecyloxymethyl, 2-dodecyloxymethyl, 3-dodecyloxymethyl, 4-dodecyloxymethyl, 1-tridecyloxymethyl, 1-tridecyloxymethyl, 2-tridecyloxymethyl, 3-tridecyloxymethyl, 4-tridecyloxymethyl, 5-tridecyloxymethyl, 6-tridecyloxymethyl, stearyloxymethyl, phenoxymethyl, benzyloxymethyl, p-ethylphenoxymethyl, tolyloxymethyl, cyclopentyloxymethyl, cyclohexyloxymethyl, norbornyloxymethyl, 1-methoxyethyl, 2-methoxyethyl, 1-ethoxyethyl, 2-ethoxyethyl, 1-propoxyethyl, 2-propoxyethyl, 1-butoxyethyl, 2-butoxyethyl, t-butoxyethyl, 1-pentyloxyethyl, 2-pentyloxyethyl, 3-pentyloxyethyl, 1-hexyloxyethyl, 2-hexyloxyethyl, 3-hexyloxyethyl, 1-heptyloxyethyl, 2-heptyloxyethyl, 1-octyloxyethyl, 2-octyloxyethyl, 3-octyloxyethyl, 4-octyloxyethyl, 1-nonyloxyethyl, 2-nonyloxyethyl, 3-nonyloxyethyl, 4-nonyloxyethyl, 1-decyloxyethyl, 2-decyloxyethyl, 3-decyloxyethyl, 4-decyloxyethyl, 5-decyloxyethyl, 1-undecyloxyethyl, 2-undecyloxyethyl, 3-undecyloxyethyl, 4-undecyloxyethyl, 1-dodecyloxyethyl, 2-dodecyloxyethyl, 3-dodecyloxyethyl, 4-dodecyloxyethyl, 1-tridecyloxyethyl, 2-tridecyloxyethyl, 3-tridecyloxyethyl, 4-tridecyloxyethyl, 5-tridecyloxyethyl, 6-tridecyloxyethyl, stearyloxyethyl, phenoxyethyl, benzyloxyethyl, p-ethylphenoxyethyl, tolyloxyethyl, cyclopentyloxyethyl, cyclohexyloxyethyl, norbornyloxyethyl, 1,2-dimethoxyethyl, 1,2-dimethoxypropyl, 2,3-dimethoxypropyl, 1,3-dimethoxypropyl, 1,2,3-trimethoxypropyl, 1,2-diethoxyethyl, 1,2-diethoxypropyl, 2,3-diethoxypropyl, 1,3-diethoxypropyl, 1,2,3-triethoxypropyl, 1-methoxy-2-diethoxyethyl, etc. When two or three of $R^3$, $R^4$, $R^5$, $R^6$, $R^7$, $R^8$ and $R^9$ combine with each other to form a cyclic structure, examples thereof include 1,2-ethylene, 1,3-propylene, 1,4-butylene, 1,5-pentylene, 1,6-hexylene, 1,4-pentylene, 2-methyl-1,4-butylene, 1,3-cyclopentylene, 1,4-cyclohexylene,2 etc. Of these, $R^3$ is preferably hydrogen, methyl, hydroxymethyl, 1-hydroxyethyl, 2-hydroxyethyl or 1,2-dihydroxyethyl, and more preferably hydrogen or hydroxymethyl. $R^4$ is preferably hydrogen, methyl, hydroxymethyl, 1-hydroxyethyl, 2-hydroxyethyl or 1,2-dihydroxyethyl, and more preferably hydrogen. $R^5$ is preferably hydrogen, methyl, hydroxymethyl, 1-hydroxyethyl, 2-hydroxyethyl or 1,2-dihydroxyethyl, and more preferably hydrogen or hydroxymethyl. $R^6$ is preferably hydrogen, methyl, hydroxymethyl, 1-hydroxyethyl, 2-hydroxyethyl or 1,2-dihydroxyethyl, and more preferably hydrogen or hydroxymethyl. $R^7$ is preferably hydrogen, methyl, hydroxymethyl, 1-hydroxyethyl, 2-hydroxyethyl or 1,2-dihydroxyethyl, and more preferably hydrogen. $R^8$ is preferably hydrogen, methyl, hydroxymethyl, 1-hydroxyethyl, 2-hydroxyethyl or 1,2-dihydroxyethyl, and more preferably hydrogen or hydroxymethyl. $R^9$ is preferably hydrogen, methyl, hydroxymethyl, 1-hydroxyethyl, 2-hydroxyethyl or 1,2-dihydroxyethyl, and more preferably hydrogen or methyl.

h is an integer ranging from 0 to 4, preferably 1 or 2, and more preferably 1.

i is an integer ranging from 1 to 4, preferably 1 or 2, and more preferably 1.

j is an integer ranging from 0 to 4, preferably 0, 1 or 2, and more preferably 0.

k is an integer ranging from 0 to 4, preferably 0, 1 or 2, and more preferably 0 or 1.

m is from 2 to 6, preferably 2 or 3, and more preferably 2.

The degree of polymerization of the hydroxy-modified imine polymers of the invention is from 20 to 50,000, preferably from 100 to 10,000, and more preferably from 500 to 5,000.

The ratio of repeating units represented by general formula (I) to the hydroxy-modified imine polymer of the invention is 5 mol % or more, preferably from 5 to 80 mol %, and more preferably from 5 to 70 mol %.

Two or more of the hydroxy-modified imine polymers having the structure represented by general formula (I) maybe combined.

The hydroxy-modified imine polymer of the invention may contain repeating units having a structure of the following general formula (III) in the repeating units thereof, in addition to general formula (I).

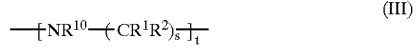

(III)

In the formula, $R^1$ and $R^2$ are each the same as $R^1$ and $R^2$ in general formula (I), $R^{10}$ is a straight chain or branched alkyl group within the range of 1 to 10 carbon atoms or an alkyl group having an alicyclic structure, s is from 2 to 6, preferably 2, and t is from 0 to 3000, preferably from 0 to 1000. Taking the number of the repeating units represented by general formula as n, the ratio of the number n of the repeating units to the total (100%) of n and t is from 5 to 100%, and preferably from 20 to 100%. Specific examples of $R^{10}$ include methyl, ethyl, propyl, 2-propyl, butyl, 2-butyl, pentyl, hexyl, octyl, decyl, cyclohexyl, benzyl, phenethyl, decahydronaphthyl, etc. Of these, preferred are ethyl, butyl, hexyl and benzyl.

Specific examples of component (A) include straight chain or branched polyethyleneimine, and copolymers of polyethyleneimine and dicarboxylic acids such as malonic acid, succinic acid, adipic acid, octanedicarboxylic acid, cyclohexanedicarboxylic acid, terephthalic acid, isophthalic acid, phthalic acid and naphthalenedicarboxylic acid, that is to say, ones obtained by modification with cyclic ether compounds or hydrocarbon compounds having both hydrocarbon halide groups and hydroxyl groups on carbon atoms different therefrom (hereinafter referred as to "halohydroxy compounds" for brevity), using ethyleneimine polymers such as ethyleneimine adducts of polyaminepolyamides, poly(ethyleneimine-urea) and polyethyleneimine-polyethylene glycol copolymers as starting materials.

The starting material is preferably include straight chain or branched polyethyleneimine.

The degree of polymerization of the polyethyleneimine polymers to be modified is from 50 to 50,000, preferably from 100 to 10,000, and more preferably from 500 to 5,000.

Compounds used for modification are epoxy group-containing hydrocarbon compounds, hydroxyl group-containing epoxy compounds and hydroxyl group-containing hydrocarbon halides.

Specific examples of the epoxy group-containing hydrocarbon compounds include ethylene oxide, propylene oxide, ethylethylene oxide, 2,3-dimethylethylene oxide, propylethylene oxide, 1-ethyl-2-methylethylene oxide, etc. Of these, ethylene oxide and propylene oxide are preferred.

Specific examples of the hydroxyl group-containing epoxy compounds include glycidol, 2-methyl-2,3-epoxypropanol, 3,4-epoxybutanol, 2,3-epoxybutanol, 1,2-epoxy-3-butanol, 2,3-epoxy-1,4-butanediol, 1,2-epoxy-3,4-butandiol, 2,3-epoxy-2-hydroxymethylpropanol, 3,4-epoxy-3-hydroxymethylbutanol, 3-methyl-2,3-epoxybutanol, 3-methyl-2,3-epoxy-1,4-butanediol, 2,3-epoxy-2,3-dihydroxymethyl-1,4-butanediol, 3,4-epoxy-2-hydroxymethylbutanol, 2,3-epoxypentanol, 3,4-epoxypentanol, 4,5-epoxypentanol, 3,4-epoxy-2-pentanol, 4,5-epoxy-2-pentanol, 1,2-epoxy-3-pentanol, 3,4-epoxy-1,2-pentanediol, 4,5-epoxy-1,2-pentanediol, 4,5-epoxy-1,3-pentanediol, 4,5-epoxy-2,3-pentanediol, 2,3-epoxy-1,4-pentanediol, 2,3-epoxy-1,5-pentanediol, 4,5-epoxy-1,2,3-pentanetriol, 2,3-epoxy-1,4,5-pentanetriol, 2,3-epoxyhexanol, 2,3-epoxy-4-hexanol, 3,4-epoxyhexanol, 4,5-epoxyhexanol, 5,6-epoxyhexanol, 3,4-epoxy-2-hexanol, 4,5-epoxy-2-hexanol, 5,6-epoxy-2-hexanol, 1,2-epoxy-3-hexanol, 4,5-epoxy-3-hexanol, 5,6-epoxy-3-hexanol, 3,4-epoxy-1,2-hexanediol, 4,5-epoxy-1,2-hexanediol, 5,6-epoxy-1,2-hexanediol, 4,5-epoxy-1,3-hexanediol, 5,6-epoxy-1,3-hexanediol, 2,3-epoxy-1,4-hexanediol, 5,6-epoxy-1,4-hexanediol, 2,3-epoxy-1,5-hexanediol, 3,4-epoxy-1,5-hexanediol, 2,3-epoxy-1,6-hexanediol, 3,4-epoxy-1,6-hexanediol, 4,5-epoxy-1,6-hexanediol, 4,5-epoxy-2,3-hexanediol, 5,6-epoxy-2,3-hexanediol, 1,2-epoxy-3,5-hexanediol, 3,4-epoxy-2,5-hexanediol, 1,2-epoxy-3,4-hexanediol, 4,5-epoxy-1,2,3-hexanetriol, 5,6-epoxy-1,2,3-hexanetriol, 5,6-epoxy-1,2,4-hexanetriol, 3,4-epoxy-1,2,5-hexanetriol, 3,4-epoxy-1,2,5-hexanetriol, 3,4-epoxy-1,2,6-hexanetriol, 4,5-epoxy-1,2,6-hexanetriol, 5,6-epoxy-1,3,4-hexanetriol, 4,5-epoxy-1,3,6-hexanetriol, 2,3-epoxy-1,4,5-hexanetriol, 5,6-epoxy-2,3,4-hexanetriol, 5,6-epoxy-1,2,3,4-hexanetetraol, 3,4-epoxy1,2,5,6-hexanetetraol, 2,3-epoxyoctanol, 3,4-epoxyoctanol, 1,2-epoxy-3-octanol, 3,4-epoxy-2-octanol, 2,3-epoxynonanol, 3,4-epoxynonanol, 1,2-epoxy-3-nonanol, 3,4-epoxy-2-nonanol, 2,3-epoxydecanol, 3,4-epoxydecanol, 4,5-epoxydecanol, 5,6-epoxydecanol, 7,8-epoxydecanol, 8,9-epoxydecanol, 1,2-epoxy-3-decanol, 3,4-epoxy-2-decanol, 2,3-epoxydodecanol, 3,4-epoxydodecanol, 4,5-epoxydodecanol, 5,6-epoxydodecanol, 7,8-epoxydodecanol, 8,9-epoxydodecanol, 1,2-epoxy-3-dodecanol, 3,4-epoxy-2-dodecanol, 2,3-epoxyhexadecanol, 3,4-epoxyhexadecanol, 4,5-epoxyhexadecanol, 5,6-epoxyhexadecanol, 7,8-epoxyhexadecanol, 8,9-epoxyhexadecanol, 11,12-epoxyhexadecanol, 1,2-epoxy-3-hexadecanol, 3,4-epoxy-2-hexadecanol, 2,3-epoxycyclopentanol, 3,4-epoxycyclopentanol, 2,3-epoxy-1,4-cyclopentanediol, 2,3-epoxy-1,5-cyclopentanediol, 3,4-epoxy-2-hydroxymethylcyclopentanol, 4,5-epoxy-1,2,3-cyclopentanetriol, 2,3-epoxy-4-hydroxymethyl-cyclopentanol, 2,3-epoxycyclohexanol, 3,4-epoxycyclohexanol, 3,4-epoxycyclohexane-1,5-diol, 2,3-epoxy-cyclohexane-1,4-diol, 4,5-epoxy-cyclohexane-1,2-diol, 2,3-epoxy-cyclohexane-1,4,5-triol, 2,3-epoxy-cyclohexane-1,4,6-triol, 2,3-epoxy-cyclohexane-1,5,6-triol, 1,2-epoxy-cyclohexane-3, 4,5,6-tetraol, 1-hydroxymethyl-1,2-epoxycyclohexane, 3-hydroxymethyl-1,2-epoxycyclohexane, 4-hydroxymethyl-1,2-epoxycyclohexane, 3,4-di(hydroxymethyl)-1,2-epoxycyclohexane, 3,5-di(hydroxymethyl)-1,2-epoxycyclohexane, 3,6-di (hydroxymethyl)-1,2-epoxycyclohexane, 4,5-di (hydroxymethyl)-1,2-epoxycyclohexane, 4-hydroxymethyl-2,3-epoxycyclohexanol, 5-hydroxymethyl-2,3-epoxycyclohexanol, 5-hydroxymethyl-3,4-epoxycyclohexanol, 5,6-epoxy-bicyclo[2.2.1]heptane-2-ol, 3-phenyl-2,3-epoxypropanol, 1-phenyl-2,3-epoxypropabol, and hydroxyl group-containing epoxy compounds such as stereoisomers, geometrical isomers and positional isomers of them.

Of these hydroxyl group-containing epoxy compounds, glycidol, 3,4-epoxybutanol, 2,3-epoxybutanol and 2,3-epoxy-1,4-butanediol are preferred, and glycidol is more preferred.

The halogen-containing hydroxy compounds used for modification are hydrocarbon compounds each having a hydrocarbon group substituted by a halogen atom selected from a chlorine atom, a bromine atom and iodine atom and a plurality of hydroxyl groups on carbon atoms different therefrom, and each having a straight chain, branched, alicyclic or aromatic structure within the range of 3 to 20 carbon atoms, preferably 3 to 16 carbon atoms, or an alkyl ether structure.

Of these, more preferred is hydroxy-modified polyethyleneimine represented by the following general formula (IV):

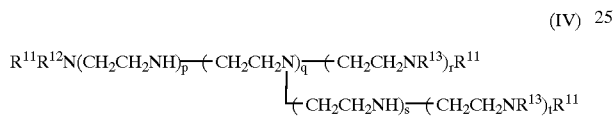
(IV)

In the formula, $R^{11}$ and $R^{12}$ are each a group represented by the following formula (V), an alkyl group within the range of 1 to 10 carbon atoms, or a hydrogen atom, $R^{13}$ is a group represented by the following formula (V), p, q, r, s and t are each independently an integer ranging from 0 to 600, preferably 1 to 300, and the total of p, q, r, s and t is from 50 to 50,000, preferably from 100 to 10,000, and more preferably from 500 to 5,000.

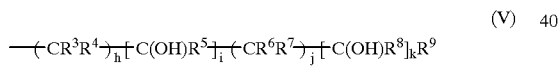
(V)

In the formula, $R^3$ to $R^9$ and h, i, j and k are each the same as $R^3$ to $R^9$ and h, i, j and k in the above-mentioned general formula (I).

Of these, most preferred is one obtained by modifying polyethyleneimine with glycidol, and this comprises a polyethyleneimine structure in which 2,3-dihydroxypropyl groups or 1-hydroxymethyl-2-hydroxyethyl groups combine with nitrogen atoms of polyethyleneimine.

The surface treating agents containing these hydroxy-modified imine polymers may contain other components, for example, antistatic agents, crosslinking agents, salts, etc.

(2) Polymer Type Antistatic Agents {Component (B)}

The antistatic agents used in the surface treating agents for the films of the invention are polymer type antistatic agents, and cationic type agents, anionic type agents, amphoteric type agents, nonionic type agents, etc. can be used. The cationic type agents include ammonium salts (ones having a primary to tertiary amine salt or quaternary ammonium salt structure), or ones having a phosphonium salt structure. The anionic type agents are alkali metal salts of sulfonic acids, phosphoric acid, carboxylic acids, etc., and examples thereof include ones having alkali metal salts (for example, lithium salts, sodium salts, potassium salts, etc.) of acrylic acid, methacrylic acid, maleic acid (anhydride), etc.

in their molecular structure. The amphoteric type agents are ones having both the above-mentioned cationic type and anionic type structures in the same molecule, and examples thereof include betaine type antistatic agents. The nonionic type agents include ethylene oxide polymers having an alkylene oxide structure, and polymers containing an ethylene oxide polymerization component in their molecular chain. In addition, examples thereof also include polymer type antistatic agents having boron in their molecular structure. Of these, preferred are the nitrogen-containing antistatic polymers, and more preferred are the tertiary nitrogen- or quaternary nitrogen-containing acrylic polymers. Specific examples thereof include ones represented by the following chemical formulas (i) to (iv) as monomers:

Chemical formula (i)

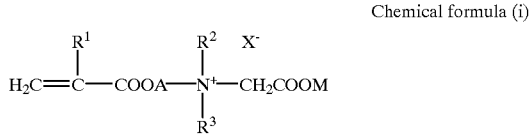

Chemical formula (ii)

Chemical formula (ii)

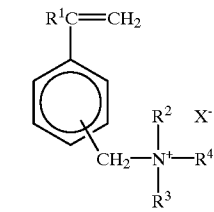
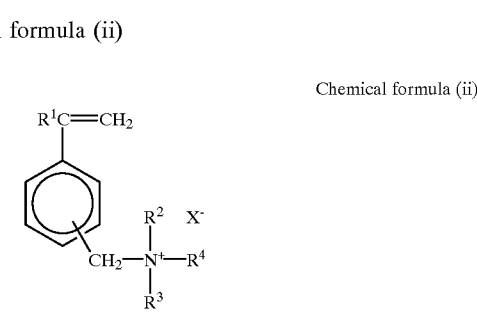

(in the formula, a $-CH_2N^+R^2R^3R^4X^-$ group is at the ortho, meta or para position to a $-CR^1=CH_2$ group on an aromatic ring.)

Chemical formula (iii)

Chemical formula (iii)

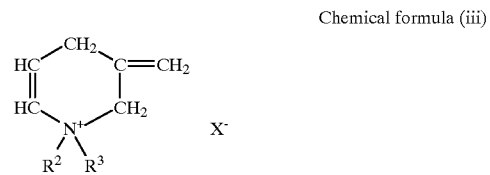

Chemical formula (iv)

Chemical formula (iv)

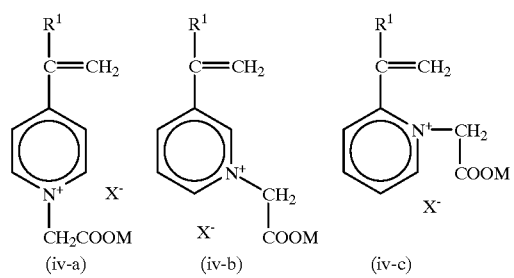

(iv-a)    (iv-b)    (iv-c)

In each chemical formula of the above (i) to (iv), $R^1$ represents a hydrogen atom or a methyl group, $R^2$ and $R^3$ each represents a lower alkyl group (particularly having from 1 to 4 carbon atoms, and more preferably from 1 to 2 carbon atoms), $R^4$ represents a saturated or unsaturated alkyl or cycloalkyl group having from 1 to 22 carbon atoms, $X^-$ represents a counter ion of quaternized $N^+$ (for example, a halide (particularly a chloride), M represents an alkali metal ion (particularly sodium, potassium or lithium), and A represents an alkylene group having from 2 to 6 carbon atoms.

Needless to say, the polymers of the quaternary nitrogen-containing monomers represented by the above-mentioned chemical formulas (i), (ii), (iii) and (iv) can be allowed to exist in polymers by polymerizing tertiary nitrogen-containing monomers, precursors thereof, and then, quaternizing them with cationizing agents such as alkyl halides, dimethylsulfuric acid and monochloroacetic acid esters.

In the invention, the antistatic agents are required to be water-soluble. However, it is undesirable to be excessively water-soluble. Accordingly, it is desirable that the quaternary nitrogen-containing polymers, component (B), are copolymers with hydrophobic monomers. The hydrophobic monomers include styrene or its nucleus or side chain-substituted compounds, acrylic or methacrylic esters, vinyl halides and the like.

In the invention, the particularly preferred antistatic agent polymers, component (B), comprise copolymers of the following components (a) to (c):

Component (a): Quaternary nitrogen-containing monomer represented by chemical formulas (i) to (iv) 20 to 60% by weight Component (b): Monomer represented by general formula:

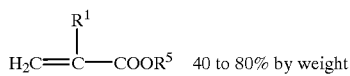
40 to 80% by weight (in the formula, R1 represents a hydrogen atom or a methyl group, and R5 represents an alkyl group having from 1 to 22 carbon atoms, an aralkyl group having from 7 to 22 carbon atoms or a cycloalkyl group having from 5 to 22 carbon atoms, respectively.)

Component (c): Other hydrophobic vinyl monomer(s) 0 to 20% by weight

In the invention, the most preferred antistatic agents, component (B), are ones in which $X^-$ is $Cl^-$ in the monomers of the above-mentioned chemical formula (i) in the quaternary nitrogen-containing monomers, component (a).

Further, as described in JP-A-6-25447, component (B) is also preferably quaternary ammonium salt type copolymers of a structure obtained by copolymerizing (a') Monomer represented by general formula

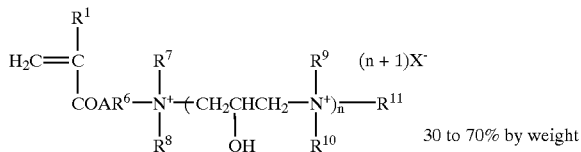
30 to 70% by weight (in the formula, A represents —O— or —NH—, $R^1$ represents a hydrogen atom or a methyl group, $R^6$ represents an alkylene group having from 2 to 4 carbon atoms or —$CH_2$—CH(OH)—$CH_2$—, $R^7$, $R^8$, $R^9$ and $R^{10}$, which may be the same or different, each represents an alkyl group having from 1 to 3 carbon atoms, $R^{11}$ represents an alkyl group having from 1 to 10 carbon atoms or an aralkyl group having from 7 to 10 carbon atoms, and X represents a chlorine atom, a bromine atom or a iodine atom.)

(b) Monomer represented by general formula

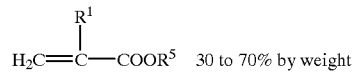
30 to 70% by weight (in the formula, $R^1$ represents a hydrogen atom or a methyl group, $R^5$ represents an alkyl group having from 1 to 22 carbon atoms, an aralkyl group having from 7 to 22 carbon atoms or a cycloalkyl group having from 5 to 22 carbon atoms, respectively.)

Component (c): Other hydrophobic vinyl monomer(s) 0 to 40% by weight

Specific examples of the monomers of the above-mentioned (a') can be obtained, for example, by modifying tertiary amine-containing monomers represented by the following general formula (VI), such as dimethylaminoethyl acrylate, diethylaminoethyl acrylate, methacrylate-corresponding compounds thereof, dimethylaminopropylacrylamide, methacrylate-corresponding compounds thereof, etc., with modifying agents represented by the following general formula (VII), such as 3-chloro-2-hydroxypropyltrimethylammonium chloride, etc., before or after polymerization.

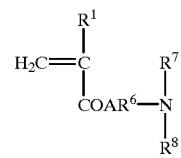
(VI)

(in the formula, A represents —O— or —NH—, $R^1$ represents a hydrogen atom or a methyl group, $R^6$ represents an alkylene group having from 2 to 4 carbon atoms or —$CH_2$—CH(OH)—$CH_2$—, and $R^7$ and $R^8$, which may be the same or different, each represents an alkyl group having from 1 to 3 carbon atoms.)

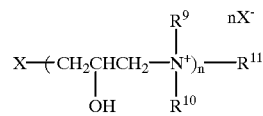
(VII)

(in the formula, $R^9$ and $R^{10}$, which may be the same or different, each represents an alkyl group having from 1 to 3 carbon atoms, $R^{11}$ represents an alkyl group having from 1 to 10 carbon atoms or an aralkyl group having from 7 to 10 carbon atoms, n is an integer of from 1 to 3, and X represents a chlorine atom, a bromine atom or a iodine atom.)

The hydrophobic monomer units of the above-mentioned component (b) include alkyl (meth)acrylates such as methyl (meth)acrylate, ethyl (meth)acrylate, butyl (meth)acrylate, isobutyl (meth)acrylate, tertiary butyl (meth)acrylate, cyclohexyl (meth)acrylate, 2-ethylhexyl (meth)acrylate, lauryl (meth)acrylate, dodecyl (meth)acrylate and stearyl (meth)acrylate.

The other monomer units, component (c), which are copolymerizable with the above-mentioned component (a) or (a') and component (b) and used as needed, include hydrophobic monomers such as styrene, vinyltoluene and vinyl acetate, and hydrophilic monomers such as vinylpyrrolidone and (meth)-acrylamide.

As polymerization methods for obtaining the copolymers, the water-soluble antistatic agents of component (B), there can be employed known polymerization methods such as bulk polymerization, solution polymerization and emulsion polymerization using radical initiators. Of these, the preferred polymerization method is solution polymerization, and this polymerization is conducted by dissolving each monomer in a solvent, adding a radical polymerization initiator, and heating with stirring in a stream of nitrogen. As the solvents, water and alcohols such as methyl alcohol, ethyl alcohol and isopropyl alcohol are preferred, and these solvents may be used as a mixture. As the polymerization initiators, there are suitably used peroxides such as benzoyl peroxide and lauroyl peroxide, and azo compounds such as azobisisobutyronitrile and azobisvaleronitrile. The concentration of the monomers is usually from 10 to 60% by weight, and the concentration of the polymerization initiators is usually from 0.1 to 10% by weight.

The molecular weight of the quaternary ammonium salt type copolymers can be adjusted to an arbitrary level depending on polymerization conditions such as the polymerization temperature, the kind and amount of polymerization initiator, the amount of the solvent used and a chain transfer agent. The molecular weight of the polymers obtained is generally from 1,000 to 1,000,000, and above all, preferably within the range of 1,000 to 500,000.

(3) Crosslinking Agents {Component (C)}

The crosslinking agents include water-soluble epoxy, isocyanate, formalin and oxazoline resins. Particularly preferred are bisphenol A-epichlorohydrin resins, epichlorohydrin resins of polyaminepolyamides, aliphatic epoxy resins, epoxy novolak resins, alicyclic epoxy resins and brominated epoxy resins, and most preferred are epichlorohydrin adducts of polyaminepolyamides, monofunctional or multifunctional glycidyl ethers and glycidyl esters.

(4) Alkali Metal Salts or Alkaline Earth Metal Salts {Component (D)}

The alkali metal salts or the alkaline earth metal salts include water-soluble inorganic salts, for example, sodium carbonate, sodium hydrogencarbonate, potassium carbonate, sodium sulfite, other alkaline salts, sodium chloride, sodium sulfate, sodium nitrate, sodium tripolyphosphate, sodium pyrophosphate, ammonium alum, calcium chloride, calcium sulfate, etc.

In addition to the above-mentioned arbitrary components (B), (C) and (D), surfactants, antifoaming agents, fine water-soluble or water-dispersible powder materials and other auxiliaries can also be contained.

(IV) Amount Ratios

When the surface treating agent (A) used in the invention is used alone, or when components (B), (C) and (D) are each used alone or as a combination of two or more of them to (A), the respective amount ratios are the following ratios to 100 parts by weight of (A):

(A) 100 parts by weight
(B) 10 to 800 parts by weight, preferably 20 to 500 parts by weight
(C) 10 to 800 parts by weight, preferably 20 to 500 parts by weight
(D) 5 to 500 parts by weight, preferably 10 to 200 parts by weight (V) Form of Surface Treating Agents for Coating (Coating Agents)

The respective components of the above-mentioned surface treating agents are used after they are dissolved in solvents such as water, methyl alcohol, ethyl alcohol, isopropyl alcohol, acetone, methyl ethyl ketone, ethyl acetate, toluene and xylene. Above all, they are normally used in the aqueous solution form. The solution concentration is usually from 0.1 to 20% by weight, and preferably from about 0.1 to about 10% by weight.

(VI) Coating Methods of Surface Treating Agents

Coating methods are performed by a roll coater, a blade coater, an air knife coater, a size press coater, a gravure coater, a reverse coater a die coater, a spray coater, immersion, etc.

The amount of the surface treating agents coated is from 0.005 to 10 $g/m^2$, preferably from 0.01 to 5 $g/m^2$, and more preferably from 0.01 to 1 $g/m^2$, as solid matter.

Coating is conducted on at least one face of the film formed, and may be conducted in a forming line of the film or on the film already formed in a separate line. When the stretching process is contained, coating may be conducted before or after it. Excess solvents are removed through the drying process, as needed.

(VII) Printing

The surface-treated thermoplastic resin films thus obtained are suitable for various printing processes, and ultraviolet curing type offset printing, relief printing, gravure printing are flexographic printing are possible, not to mention oxidation polymerization type (solvent type) offset printing.

The invention is described in more detail by examples and the like shown below. As raw materials and evaluation methods used in these examples and the like, there are employed ones shown below. "Parts" in the compounding ratio are "parts by weight".

[1] Surface Treating Agents
(A) Hydroxy-Modified Imine Polymers
(A-1) Glycidol-Modified Polyethyleneimine: 23 Mol % Modified In a four neck flask equipped with a stirrer, a reflux condenser, a thermometer and an inlet for introducing nitrogen gas, 100 parts of a 25 wt % aqueous solution of polyethleneimine, "Epomin; P-1000" (trade name, the degree of polymerization: 1600) manufactured by Nippon Shokubai Kagaku Kogyo Co., Ltd., 10 parts of glycidol and 10 parts of propylene glycol monomethyl ether were placed, and stirred in a stream of nitrogen to conduct modification reaction at a temperature of 80° C. for 16 hours, thereby obtaining an aqueous solution of glycidol-modified polyethyleneimine. This was dried, and then, It was confirmed by infrared spectroscopic analysis, $^1$H-nuclear magnetic resonance spectroscopic analysis ($^1$H-NMR) and $^{13}$C-nuclear magnetic resonance spectroscopic analysis ($^{13}$C-NMR) that this had a structure formed by addition of the epoxy group of glycidol to nitrogen of polyethyleneimine, and was product (A-1) in which 23 mol % of nitrogen of polyethyleneimine was reacted with glycidol.

(A-2) Glycidol-Modified Polyethyleneimine: 7 Mol % Modified

An aqueous solution of product (A-2) in which 7 mol % of nitrogen of polyethyleneimine was reacted with glycidol was obtained by the same procedure as with (A-1) with the exception that the amount of glycidol used was changed to 3 parts.

(A-3) Glycidol-Modified Polyethyleneimine: 65 Mol % Modified

An aqueous solution of product (A-3) in which 65 mol % of nitrogen of polyethyleneimine was reacted with glycidol was obtained by the same procedure as with (A-1) with the exception that the amount of glycidol used was changed to 28 parts.

(A-4) 3,4-Epoxybutane-1-ol-Modified Polyethyleneimine: 29 Mol % Modified

3-Butene-1-ol (manufactured by Wako Pure Chemical Industries Ltd., reagent grade) and perbenzoic acid were reacted with each other, followed by treatment by a conventional method to obtain 3,4-epoxybutane-1-ol. Then, an aqueous solution of 3,4-epoxybutane-1-ol-modified polyethyleneimine (A-4) of 29 mol % was obtained by the same procedure as with (A-1) with the exception that 15 parts of 3,4-epoxybutane-1-ol was used in place of glycidol.

(A-5) 3,4-Epoxybutane-2-ol-Modifed Polyethyleneimine: 19 Mol % Modified

3-Butene-2-ol (manufactured by Wako Pure Chemical Industries Ltd., reagent grade) and perbenzoic acid were reacted with each other, followed by treatment by a conventional method to obtain 3,4-epoxybutane-2-ol. Then, an aqueous solution of 3,4-epoxybutane-2-ol-modified polyethyleneimine (A-45) of 19 mol % was obtained by the same procedure as with (A-1) with the exception that 10 parts of 3,4-epoxybutane-2-ol was used in place of glycidol.

(A-6) 2,3-Epoxybutane-1,4-diol-Modifed Polyethyleneimine: 16 Mol % Modified

2-Butene-1,4-diol (manufactured by Wako Pure Chemical Industries Ltd., reagent grade) and perbenzoic acid were reacted with each other, followed by treatment by a conventional method to obtain 2,3-epoxybutane-1,4-diol. Then, an aqueous solution of 2,3-epoxybutane-1,4-diol-modified polyethyleneimine of 16 mol % was obtained by the same procedure as with (A-1) with the exception that 10 parts of 2,3-epoxybutane-1,4-diol was used in place of glycidol.

(A-7) Glycidol-Modified Polyethyleneimine

An aqueous solution of modified polyethyleneimine of 46 mol % was obtained by the same procedure as with (A-1) with the exception that 100 parts of a 25 wt % solution of polyethyleneimine "Polymin-P" (trade name, the degree of polymerization: about 1600) sold by BASF Japan Ltd. and 20 parts by weight of glycidol were used in place of "Epomin; P-1000" (trade name, the degree of polymerization: 1600) manufactured by Nippon Shokubai Kagaku Kogyo Co., Ltd.

(A-8) Ethylene Oxide-Modified Polyethyleneimine

Lupasol SC61B (manufactured by BASF Japan Ltd., solid content: 37% by weight)

(A-9) Propylene Oxide-Modified Polyethyleneimine

Epomin PP-061 (manufactured by Nippon Shokubai Kagaku Kogyo Co., Ltd., solid content: 50% by weight)

(O-1) Butyl-Modified Polyethyleneimine (Control for Comparison)

In a four neck flask equipped with a stirrer, a reflux condenser, a thermometer and an inlet for introducing nitrogen gas, 100 parts of a 25wt % aqueous solution of polyethleneimine, "Epomin; P-1000" (trade name, the degree of polymerization: 1600) manufactured by Nippon Shokubai Kagaku Kogyo Co., Ltd., 10 parts of n-butyl chloride and 10 parts of propylene glycol monomethyl ether were placed, and stirred in a stream of nitrogen to conduct modification reaction at a temperature of 80° C. for 20 hours, thereby obtaining an aqueous solution of butyl-modified polyethyleneimine of 19 mol %.

(O-2) Polyethyleneimine (Control for Comparison)

A 25 wt % aqueous solution of polyethleneimine, "Epomin; P-1000" (trade name, the degree of polymerization: 1600) manufactured by Nippon Shokubai Kagaku Kogyo Co., Ltd. was used.

(B) Antistatic Agents (B-1) Quaternary Nitrogen-Containing Acrylic Resin

Into a four neck flask equipped with a reflux condenser, a thermometer, a glass tube for nitrogen substitution and a stirrer, 35 parts of dimethylaminoethyl methacrylate, 20 parts of ethyl methacrylate, 20 parts of cyclohexyl methacrylate, 25 parts of stearyl methacrylate, 150 parts of ethyl alcohol and 1 part of as azobisisobutyronitrile were added, and polymerization reaction was conducted in a stream of nitrogen at a temperature of 80° C. for 6 hours.

Then, 70 parts of a 60% solution of 3-chloro-2-hydroxypropylammonium chloride was added thereto, and the reaction was further conducted in a stream of nitrogen at a temperature of 80° C. for 6 hours. Then, water was removed by distillation while adding dropwise water to obtain quaternary ammonium salt type copolymer (B-1) having a final solid content of 30%.

This is an alkyl acrylate polymer containing a group represented by the following general formula in its molecular chain:

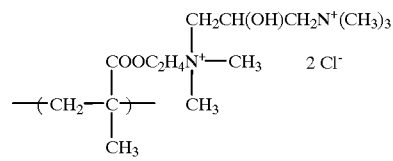

(B-2) Quaternary Nitrogen-Containing Acrylic Resin

"Saftomer ST-1100B" (trade name, solid content: 8% by weight) manufactured by Mitsubishi Chemical Corp. was used. This is an alkyl acrylate polymer containing a group represented by the following general formula in its molecular chain:

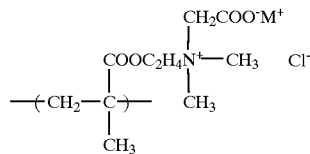

(in the formula, $M^+$ represents a cation of an alkali metal atom such as Li, Na or K, or an ammonium cation.)

(C) Crosslinking Agents (C-1) Epichlorohydrin Adduct of Plyamine.polyamide

"WS-570" (trade name, solid content: 12.5% by weight) manufactured by JAPAN PMC CORPORATION was used.

(C-2) Polyglycidyl Ether

"EX-512" (trade name, solid content: 100% by weight) manufactured by Nagase Kasei Kogyo Co., Ltd. was used.

(C-3) Sorbitol Polyglycidyl Ether

"EX-614" (trade name, solid content: 100% by weight) manufactured by Nagase Kasei Kogyo Co., Ltd. was used.

(D) Aqueous Solution of Inorganic Salt (D-1) Sodium Carbonate (manufactured by Wako Pure Chemical Industries Ltd., reagent grade)

[2] Surface Oxidation Treatments (a) Corona Discharge Treatment

An HFS 400F corona discharge treater manufactured by Kasuga ElectricWorks Ltd. was used as a corona discharge treater, and an aluminum electrode having a width of 0.8 m was used and a silicone-covered roll was used as a treater roll. The gap between the electrode and the roll was 1.3 mm, and the corona discharge treatment was conducted at a line speed of 30 m/minute at applied energy shown in Tables 1 to 4.

(b) Flame Treatment

Using a Flynn F3000 direct flame plasma treater manufactured by Flynn Burner Co. as a flame treater, and propane as combustion gas, the flame treatment was conducted at a line speed of 40 m/minute at applied energy shown in Tables 1 to 4.

[3] Base Material Resin Films

Production Example 1 (P-1)

(1) Composition (C) in which 15% by weight of heavy calcium carbonate having an average particle size of 1.5 μm was mixed with a propylene homopolymer having a melt index (MFR) of 0.8 g/10 minutes was kneaded in an extruder set at 250° C., and then, extruded in the film form, followed by cooling with a cooling apparatus to obtain an unstretched sheet. The resulting sheet was heated to a temperature of 140° C., and then, longitudinally stretched 5 times.

(2) One obtained by melt kneading composition (A) in which 50% by weight of an ethylene-propylene random copolymer having an MFR of 10 g/10 minutes, 5% by weight of maleic acid-modified polypropylene and 45% by weight of calcium carbonate having an average particle size of 1.5 μm were mixed, in an extruder set at 240° C., and one obtained by melt kneading composition (B) in which 55% by weight of a propylene homopolymer having an MFR of 4 g/10 minutes and 45% by weight of calcium carbonate having an average particle size of 1.5 μm were mixed, in another extruder set at 240° C. were laminated with each other in a die. This laminate was co-extruded on both faces of the longitudinally 5-time stretched sheet obtained in the above (1) so as to dispose (A) outside, thereby obtaining five-layer laminate (A)/(B)/(C)/(B)/(A).

This five-layer laminate was heated to 155° C., and then, transversely stretched 7.5 times to obtain a porous stretched resin film of a five-layer structure (thickness: 4 μm/28 μm/66 μm/28 μm/4 μm). The resulting film had a porosity of 33%, a density of 0.77 g/m², an opacity of 94% and a Beck smoothness of 200 seconds.

Production Example 2 (P-2)

A porous stretched resin film of a five-layer structure was obtained in the same manner as with Production Example 1 with the exception that the ethylene-propylene random copolymer having an MFR of 10 g/10 minutes in the composition of (A) in Production Example 1 of the base material film was changed to a propylene homopolymer having an MFR of 10 g/10 minutes. The resulting film had a porosity of 34%, a density of 0.77 g/m², an opacity of 95% and a Beck smoothness of 300 seconds.

Production Example 3 (P-3)

A porous stretched resin film of a five-layer structure was obtained in the same manner as with Production Example 1 with the exception that the composition of (A) in Production Example 1 of the base material film was changed to a propylene homopolymer having an MFR of 4 g/10 minutes. The resulting film had a porosity of 32%, a density of 0.78 g/m², an opacity of 93% and a Beck smoothness of 2000 seconds.

Production Example 4 (P-4)

With a mixture of 80% by weight of a propylene homopolymer having an MFR of 0.8 g/10 minutes and 8% by weight of high density polyethylene, 12% by weight of calcium carbonate having an average particle size of 1.5 μm was mixed to prepare composition (B). Aside therefrom, a propylene homopolymer having an MFR of 4 g/10 minutes was mixed to prepare compound (A). These compositions (A) and (B) were each melt kneaded in a separate extruder set at 270° C. Then, they were laminated with each other in the inside of a die so as to give (A)/(B)/(A), and co-extruded from one die in the sheet form, followed by cooling with a cooling apparatus to obtain an unstretched sheet. This sheet was heated to 155° C., and then, longitudinally stretched times, utilizing the difference in peripheral speed between a group of rolls. Then, this three-layer laminate was heated to 155° C., thereafter transversely stretched 7.5 times using a tenter, and annealed at 163° C. to obtain a three-layer film. A surface of this three-layer laminated film was subjected to the corona discharge treatment to obtain a porous stretched resin film of a three-layer structure of (A)/(B)/(A) [the respective films had thicknesses of 5 μm/50 μm/5 μm, respectively.]. The resulting film had a porosity of 21%, a density of 0.80 g/m², an opacity of 90% and a Beck smoothness of 20000 seconds.

Production Example 5 (P-5)

With a mixture of 72% by weight of a propylene homopolymer having an MFR of 0.8 g/10 minutes and 8% by weight of high density polyethylene, 20% by weight of calcium carbonate having an average particle size of 1.5 μm was mixed to prepare composition (A). Aside therefrom, 50% by weight of a propylene homopolymer having an MFR of 10 g/10 minutes, 5% by weight of maleic acid-modified polypropylene and 45% by weight of calcium carbonate having an average particle size of 1.5 μm were mixed to prepare compound (B). These compositions (A) and (B) were each melt kneaded in a separate extruder set at 270° C., and co-extruded from one die in the sheet form so as to give (A)/(B)/(A), followed by cooling with a cooling apparatus to obtain an unstretched sheet. This sheet was heated to 130° C., and then, longitudinally stretched 5 times, utilizing the difference in peripheral speed between a group of rolls, followed by annealing treatment at 145° C., thereby obtaining a three-layer film. A surface of this three-layer laminated film was subjected to the corona discharge treatment to obtain a porous stretched resin film of a three-layer structure of (A)/(B)/(A) [the respective films had thicknesses of 15 μm/100 μm/15 μm, respectively.]. The resulting film had a porosity of 30%, a density of 0.88 g/m², an opacity of 91% and a Beck smoothness of 1600 seconds.

Production Example 6 (P-6)

A resin composition obtained by mixing 80% by weight of polyethylene terephthalate "TGS83A" (grade name, manufactured by Mitsubishi Chemical Corp., [η]=0.80), 14.8% by weight of a cyclic polyolefin "Apel T" (manufactured by Mitsui Petrochemical Industries, Ltd., trade name), 5% by weight of a propylene homopolymer having a melt flow rate of 1 g/10 minutes at 230° C. at a load of 2.16 kg, and 0.2% by weight of Irganox 1010 (manufactured by Ciba Geigy, trade name) in a tumbler was melt extruded at a preset cylinder temperature of 285° C. at a number of screw revolution of 250 rpm, using a tandem screw extruder (manufactured by Japan Steel Works, Ltd.), and extruded through a die in the strand form, followed by cutting to pellets.

After sufficiently dried, the pellets were extruded through a die connected to a single screw extruder set at 285° C. in the sheet form, and both faces thereof were cooled with a casting drum set at 30° C. Then, the sheet was heated to 105° C., and stretched 2.7 times with a longitudinal stretching machine utilizing the difference in peripheral speed between a group of rolls. After further cooling, the sheet was transversely stretched 2.7 times with a tenter oven of 115° C., and allowed to pass through a heat set zone of 250° C., followed by cooling. Then, the sheet was taken up in the roll form to obtain a stretched film. The resulting film had a porosity of 24%, a density of 0.98 g/m², an opacity of 90% and a Beck smoothness of 21000 seconds.

EXAMPLE 1

The above-mentioned surface treating agent components were diluted with water so that the amount of active ingredients of the respective components gave the following compounding composition, and thoroughly stirred to obtain a coating solution.

| | |
|---|---|
| (A-1) | 1 part |
| (B-1) | 1 part |
| (C-1) WS-570 | 0.5 part |

On the other hand, both surfaces of base material resin film (P-1) of Production Example 1 described above were surface treated at a line speed of 30 m/minute at an applied energy density of 100 W·minute/m², using an HFS 400F corona discharge treater manufactured by Kasuga Electric Works Ltd. Then, both faces were coated with the above-mentioned coating agent by a roll coater so as to provide an amount coated after drying of 0.06 g/m² on one face, and dried at a temperature of about 65° C. for tens of seconds. The resulting film was taken up to obtain a surface-treated base material resin film. The offset printability (back ghost, ink transfer and adhesion), antistatic properties and the like thereof were evaluated by methods shown below.

The evaluation of the offset printability (back ghost) the transfer and adhesion of ink, and the antistatic performance were evaluated by the following measuring methods.

(a) Evaluation of Offset Printability (Back Ghost)

A pattern was offset printed on the resulting base material resin film with Dia OF-4 (Kikuyonsai) manufactured by Mitsubishi Heavy Industries, Ltd., using oxidation polymerization type ink for synthetic paper (manufactured by T&K•TOKA Co., Ltd., Best SP, four colors of black, cyan, magenda and yellow), and stored as stacked for 1 week. Then, the offset printing was made on the back face with a printing plate of 50% tint using the same ink (cyan, magenda). After the ink was dried, the evaluation of ghost on the back face was visually performed according to the following four grades:

4; There is no transfer unevenness at all (practically no problem).
3; Transfer unevenness is a little observed (practically almost no problem).
2; Density unevenness is weakly observed in a pattern on a surface (practically somewhat a problem).
1; A pattern on a surface is clearly observed (practically a problem).

Example 1 was at a level of 3. Results are shown in Table 1.

(b) Evaluation of Ink Transfer

A pattern was offset printed on the resulting base material resin film with Dia OF-4 (Kikuyonsai) manufactured by Mitsubishi Heavy Industries, Ltd., using oxidation polymerization type ink for synthetic paper (manufactured by T&K•TOKA Co., Ltd., Best SP, four colors of black, cyan, magenda and yellow), and the density of transferred ink was measured. Further, for the transfer state of ink on the whole face, it was visually observed whether there was poor transfer such as coating streaks and blank areas or not, and the ink transfer was evaluated according to the following five grades:

5; Very good (practically no problem).
4; Good (practically no problem).
3; Although the color of transferred ink is light, there is practically no hindrance (practically almost no problem).
2; The color of transferred ink is light, and coating streaks are observed (practically somewhat a problem).
1; Little transferred (practically a problem).

Example 1 was at a level of 5. Results are shown in Table 1.

(c) Measurement of Ink Adhesion

A pattern was offset printed on the resulting base material resin film with Dia OF-4 (Kikuyonsai) manufactured by Mitsubishi Heavy Industries, Ltd., using oxidation polymerization type ink for synthetic paper (manufactured by T&K•TOKA Co., Ltd., Best SP, four colors of black, deepblue, red and yellow). After one day, Cellotape (an adhesive tape manufactured by Nichiban Co., Ltd.) was stuck on and sufficiently adhered to a 100% halftone dot area, and then, quickly separated. The adhesion of ink was evaluated according to the following five grades:

5; No ink is separated at all (practically no problem).
4; Ink on a small area is separated (practically no problem).
3; A separated area is 25% or less (practically almost no problem).
2: A separated area is from about 25 to about 50% (practically somewhat a problem).
1; A separated area is 50% or more (practically a problem)

Example 1 was at a level of 5. Results are shown in Table 1.

(d) Surface Resistivity

The surface resistivity of the resulting base material resin film was measured using an insulation meter "DSM-8103 (trade name)" manufactured by Toa Electronics Ltd. under the conditions of a temperature of 23° C. and a relative humidity of 50%. One whose surface resistivity value is $1.0E+12\Omega/\square$ or less is judged to be good in paper feeding and discharge in printing.

Example 1 was $3E+10$ $\Omega/\square$. Results are shown in Table 1.

Comparative Example 1

A film was prepared and evaluated in the same manner as with Example 1 with the exception that hydroxy-modified polyethyleneimine in the coating solution was changed to alkyl-modified polyethyleneimine (O-1). Results are shown in Table 1.

Comparative Example 2

A film was prepared and evaluated in the same manner as with Example 1 with the exception that hydroxy-modified polyethyleneimine in the coating solution was changed to polyethyleneimine (O-2). Results are shown in Table 1.

EXAMPLES 2 TO 7

Films were prepared and evaluated in the same manner as with Example 1 with the exception that hydroxy-modified polyethyleneimine in the coating solution was changed. Results are shown in Table 1.

EXAMPLES 8 TO 11

Films were prepared and evaluated in the same manner as with Example 1 with the exception that hydroxy-modified polyethyleneimine in the coating solution and/or the kind of crosslinking agent in the coating solution was changed. Results are shown in Table 2.

EXAMPLE 12

A film was prepared in the same manner as with Example 11 with the exception that an aqueous solution of an inorganic salt was added to the coating solution. Results are shown in Table 2.

EXAMPLE 13

A film was prepared in the same manner as with Example 11 with the exception that the kind of antistatic agent in the coating solution was changed. Results are shown in Table 2.

EXAMPLE 14

A film was prepared in the same manner as with Example 1 with the exception that the ratios of the hydroxy-modified polyethyleneimine, antistatic agent and crosslinking agent in the coating solution were changed. Results are shown in Table 2.

EXAMPLES 15 TO 20

Films were prepared and evaluated in the same manner as with Example 1 with the exception that the base material resin film and the surface treating method were changed. Results are shown in Table 2.

Comparative Examples 3 TO 7

Films were prepared and evaluated in the same manner as with Example 1 with the exception that the base material resin film was changed and hydroxy-modified polyethyleneimine in the coating solution was changed to alkyl-modified polyethyleneimine (O-1). Results are shown in Table 3.

EXAMPLE 21

A film was prepared in the same manner as with Example 1 with the exception that the coating solution was changed to an aqueous solution of hydroxy-modified polyethyleneimine alone. Results are shown in Table 4.

Comparative Example 8

A film was prepared in the same manner as with Example 1 with the exception that the coating solution was changed to an aqueous solution of alkyl-modified polyethyleneimine alone. Results are shown in Table 4.

EXAMPLES 22 AND 23

Films were prepared and evaluated in the same manner as with Example 1 with the exception that the coating solution was changed to an aqueous solution of hydroxy-modified polyethyleneimine alone. Results are shown in Table 4.

EXAMPLE 24

A film was prepared in the same manner as with Example 1 with the exception that the coating solution was changed to an aqueous solution of hydroxy-modified polyethyleneimine and an antistatic agent. Results are shown in Table 4.

Comparative Example 9

A film was prepared in the same manner as with Example 1 with the exception that the coating solution was changed to an aqueous solution of alkyl-modified polyethyleneimine and an antistatic agent. Results are shown in Table 4.

EXAMPLE 25

A film was prepared in the same manner as with Example 1 with the exception that the coating solution was changed to an aqueous solution of hydroxy-modified polyethyleneimine and an antistatic agent. Results are shown in Table 4.

EXAMPLE 26

A film was prepared in the same manner as with Example 1 with the exception that the coating solution was changed to an aqueous solution of hydroxy-modified polyethyleneimine and an antistatic agent and the surface treating method was changed. Results are shown in Table 4.

TABLE 1

|  | Example 1 | Comparative Example 1 | Comparative Example 2 | Example 2 | Example 3 | Example 4 | Example 5 | Example 6 | Example 7 |
|---|---|---|---|---|---|---|---|---|---|
| Film |  |  |  |  |  |  |  |  |  |
| Base Material Resin Film | P-1 | P-1 | P-1 | P-1 | P-1 | P-1 | P-1 | P-1 | P-1 |
| Kind of Surface Treatment | Corona treatment | Corona treatment | Corona treatment | Corona treatment | Corona treatment | Corona treatment | Corona treatment | Corona treatment | Corona treatment |
| Surface Treatment Intensity (W · minute/m$^2$) | 100 | 100 | 100 | 100 | 100 | 100 | 100 | 100 | 100 |
| Formulation of Surface Treating Agent and Amount Thereof Used (part) | (A-1) 1 (B-1) 1 (C-1) 0.5 | (O-1) 1 (B-1) 1 (C-1) 0.5 | (O-2) 1 (B-1) 1 (C-1) 0.5 | (A-2) 1 (B-1) 1 (C-1) 0.5 | (A-3) 1 (B-1) 1 (C-1) 0.5 | (A-4) 1 (B-1) 1 (C-1) 0.5 | (A-5) 1 (B-1) 1 (C-1) 0.5 | (A-6) 1 (B-1) 1 (C-1) 0.5 | (A-7) 1 (B-1) 1 (C-1) 0.5 |
| Offset Printability |  |  |  |  |  |  |  |  |  |
| Back Ghost | 3 | 1 | 1 | 3 | 3 | 3 | 3 | 3 | 3 |
| Ink Transfer | 5 | 5 | 5 | 5 | 5 | 5 | 5 | 5 | 5 |
| Ink Adhesion | 5 | 5 | 5 | 5 | 5 | 5 | 5 | 5 | 5 |
| Antistatic Properties |  |  |  |  |  |  |  |  |  |
| Surface Resistivity (Ω/□) (23° C., 50% RH) | 3E+10 | 9E+9 | 4E+10 | 5E+10 | 2E+10 | 4E+10 | 2E+10 | 3E+10 | 1E+10 |

TABLE 2

| | Example 8 | Example 9 | Example 10 | Example 11 | Example 12 | Example 13 | Example 14 | Example 15 | Example 16 |
|---|---|---|---|---|---|---|---|---|---|
| Film | | | | | | | | | |
| Base Material Resin Film | P-1 | P-1 | P-1 | P-1 | P-1 | P-1 | P-1 | P-2 | P-3 |
| Kind of Surface Treatment | Corona treatment | Corona treatment | Corona treatment | Corona treatment | Corona treatment | Corona treatment | Corona treatment | Corona treatment | Corona treatment |
| Surface Treatment Intensity (W · minute/m$^2$) | 100 | 100 | 100 | 100 | 100 | 100 | 100 | 100 | 100 |
| Formulation of Surface Treating Agent and Amount Thereof Used (part) | (A-1) 1 (B-1) 1 (C-2) 1 | (A-8) 1 (B-1) 1 (C-2) 1 | (A-9) 1 (B-1) 1 (C-2) 1 | (A-1) 1 (B-1) 1 (C-3) 1 | (A-3) 1 (B-1) 1 (C-3) 1.0 Sodium carbonate 0.1 | (A-1) 1 (B-2) 1 (C-3) 1 | (A-1) 1 (B-1) 0.6 (C-1) 0.5 | (A-1) 1 (B-1) 1 (C-1) 0.5 | (A-1) 1 (B-1) 1 (C-1) 0.5 |
| Offset Printability | | | | | | | | | |
| Back Ghost | 3 | 3 | 3 | 3 | 3 | 3 | 3 | 4 | 4 |
| Ink Transfer | 5 | 5 | 5 | 5 | 5 | 5 | 5 | 5 | 5 |
| Ink Adhesion | 5 | 5 | 4 | 5 | 4 | 5 | 5 | 4 | 5 |
| Antistatic Properties | | | | | | | | | |
| Surface Resistivity (Ω/□) (23° C., 50% RH) | 7E+10 | 8E+10 | 9E+10 | 4E+10 | 1E+10 | 6E+10 | 9E+10 | 3E+10 | 5E+10 |

TABLE 3

| | Example 17 | Example 18 | Example 19 | Example 20 | Comparative Example 3 | Comparative Example 4 | Comparative Example 5 | Comparative Example 6 | Comparative Example 7 |
|---|---|---|---|---|---|---|---|---|---|
| Film | | | | | | | | | |
| Base Material Resin Film | P-4 | P-5 | P-6 | P-1 | P-1 | P-3 | P-4 | P-5 | P-6 |
| Kind of Surface Treatment | Corona treatment | Corona treatment | Corona treatment | Flame treatment | Corona treatment | Corona treatment | Corona treatment | Corona treatment | Corona treatment |
| Surface Treatment Intensity (W · minute/m$^2$) | 100 W · min./cm$^2$ | 100 W · min./cm$^2$ | 100 W · min./cm$^2$ | 37700 J/m$^2$ | 100 W · min./cm$^2$ | 100 W · min./cm$^2$ | 100 W · min./cm$^2$ | 100 W · min./cm$^2$ | 100 W · min./cm$^2$ |
| Formulation of Surface Treating Agent and Amount Thereof Used (part) | (A-1) 1 (B-1) 1 (C-1) 0.5 | (A-1) 1 (B-1) 1 (C-1) 0.5 | (A-1) 1 (B-1) 1 (C-1) 0.5 | (A-1) 1 (B-1) 1 (C-1) 0.5 | (O-1) 1 (B-1) 1 (C-1) 0.5 | (O-1) 1 (B-1) 1 (C-1) 0.5 | (O-1) 1 (B-1) 1 (C-1) 0.5 | (O-1) 1 (B-1) 1 (C-1) 0.5 | (O-1) 1 (B-1) 1 (C-1) 0.5 |
| Offset Printability | | | | | | | | | |
| Back Ghost | 4 | 4 | 3 | 3 | 1 | 2 | 2 | 2 | 2 |
| Ink Transfer | 5 | 5 | 5 | 5 | 5 | 5 | 5 | 5 | 5 |
| Ink Adhesion | 4 | 4 | 5 | 5 | 5 | 5 | 4 | 4 | 5 |
| Antistatic Properties | | | | | | | | | |
| Surface Resistivity (Ω/□) (23° C., 50% RH) | 2E+10 | 3E+10 | 5E+10 | 3E+10 | 3E+10 | 4E+10 | 5E+10 | 4E+10 | 3E+10 |

TABLE 4

| | Example 21 | Comparative Example 8 | Example 22 | Example 23 | Example 24 | Comparative Example 9 | Example 25 | Example 26 |
|---|---|---|---|---|---|---|---|---|
| Film | | | | | | | | |
| Base Material Resin Film | P-1 | P-1 | P-1 | P-2 | P-1 | P-1 | P-2 | P-2 |
| Kind of Surface Treatment | Corona treatment | Corona treatment | Corona treatment | Corona treatment | Flame treatment | Corona treatment | Corona treatment | Corona treatment |
| Surface Treatment Intensity (W · minute/m$^2$) | 100 W · min./cm$^2$ | 100 W · min./cm$^2$ | 100 W · min./cm$^2$ | 100 W · min./cm$^2$ | 37700 J/m$^2$ | 100 W · min./cm$^2$ | 100 W · min./cm$^2$ | 37700 J/m$^2$ |
| Formulation of Surface Treating Agent and Amount Thereof Used (part) | (A-1) 1 | (O-1) 1 | (A-3) 1 | (A-4) 1 | (A-1) 1 (B-1) 1 | (O-1) 1 (B-1) 1 | (A-3) 1 (B-1) 1 | (A-1) 1 (B-1) 1 |
| Offset Printability | | | | | | | | |
| Back Ghost | 3 | 1 | 3 | 3 | 3 | 1 | 3 | 3 |
| Ink Transfer | 3 | 2 | 3 | 3 | 5 | 5 | 5 | 5 |
| Ink Adhesion | 5 | 5 | 5 | 5 | 5 | 5 | 4 | 4 |

TABLE 4-continued

| | Example 21 | Comparative Example 8 | Example 22 | Example 23 | Example 24 | Comparative Example 9 | Example 25 | Example 26 |
|---|---|---|---|---|---|---|---|---|
| Antistatic Properties Surface Resistivity (Ω/□) (23° C., 50% RH) | — | — | — | — | 4E+10 | 1E+10 | 2E+10 | 5E+10 |

INDUSTRIAL APPLICABILITY

The thermoplastic resin films according the invention have antistatic properties and water resistance, and excellent printability of generating no back ghost even when double-face offset printing with oxidation polymerization type ink is performed. The thermoplastic resin films obtained by the invention, particularly synthetic paper, are useful for applications such as poster paper, wrapping paper, stickers, labels such as namers (labels on which usages and notices are written) for industrial products, etc.

What is claimed is:

1. A thermoplastic resin film having on a surface thereof a hydroxy-modified imine polymer containing repeating units represented by the following general formula (I) in an amount of 5 mol % or more based on the total of repeating units:

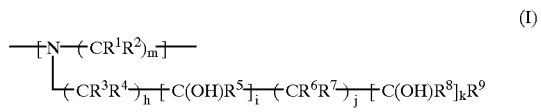

(I)

wherein $R^1$ and $R^2$ are each independently a hydrogen atom, or a straight chain or branched alkyl group within the range of 1 to 10 carbon atoms, an alkyl group having an alicyclic structure or an aryl group, $R^3$, $R^4$, $R^5$, $R^6$, $R^7$, $R^8$ and $R^9$ are each independently a hydrogen atom, or an alkyl group within the range of 1 to 20 carbon atoms, a cycloalkyl group, an aryl group, an aralkyl group, an alkylaryl group, groups each alternately forming bonds to form a cyclic structure, an alkyloxyalkyl group having a straight chain, branched or alicyclic structure within the range of 1 to 20 carbon atoms, an alkylaryloxyalkyl group, a hydroxyalkyl group having a straight chain, branched or alicyclic structure within the range of 1 to 20 carbon atoms or an aryl group-containing hydroxyalkyl group, h is an integer ranging from 0 to 4, i is an integer ranging from 1 to 4, j is an integer ranging from 0 to 4, k is an integer ranging from 0 to 4 and m is an integer ranging from 2 to 6.

2. The thermoplastic resin film according to claim 1, wherein the film has said hydroxy-modified imine polymer and a polymeric antistatic agent on the surface thereof.

3. The thermoplastic resin film according to claim 1, wherein the film has a crosslinking agent selected from the group consisting of water-soluble epoxy, isocyanate, formalin and oxazoline crosslinking agents, and an epichlorohydrin resin of a polyaminepolyamide on the surface thereof.

4. The thermoplastic resin film according to claim 2, wherein the film has a crosslinking agent selected from the group consisting of water-soluble epoxy, isocyanate, formalin and oxazoline crosslinking agents, and an epichlorohydrin resin of a polyaminepolyamide on the surface thereof.

5. The thermoplastic resin film according to claim 1, wherein said thermoplastic resin film is a porous stretched resin film.

6. The thermoplastic resin film according to claim 2, wherein said thermoplastic resin film is a porous stretched resin film.

7. The thermoplastic resin film according to claim 3, wherein said thermoplastic resin film is a porous stretched resin film.

8. The thermoplastic resin film according to claim 4, wherein said thermoplastic resin film is a porous stretched resin film.

9. The thermoplastic resin film according to claim 1, wherein the resin of the thermoplastic film is a high density polyethylene, an intermediate density polyethylene, a polypropylene resin, a polymethyl-1-pentene resin, an ethylene-cyclic olefin copolymer, a polyamide resin, a thermoplastic polyester resin, a polycarbonate, atactic polystyrene, syndiotactic polystyrene, polymethyl methacrylate, polyvinyl chloride, polyvinylidene chloride, ethylene-vinyl chloride or polyphenylene sulfide.

10. The thermoplastic resin film according to claim 1, wherein the degree of polymerization of the hydroxy-modified imine polymer ranges from 20 to 50,000.

11. The thermoplastic resin film according to claim 10, wherein the degree of polymerization of the hydroxy-modified imine polymer ranges from 100 to 10,000.

12. The thermoplastic resin film according to claim 1, wherein the ratio of repeating units of the pendant groups of the imine polymer to the hydroxy-modified imine polymer is 5 mole % or more.

13. The thermoplastic resin film according to claim 1, wherein the hydroxy-modified imine polymer is prepared by reacting an epoxy group-containing hydrocarbon compound, a hydroxyl group-containing epoxy compound or a hydroxyl group-containing hydrocarbon halide with a polyethyleneimine.

14. The thermoplastic resin film according to claim 1, wherein the thermoplastic resin film is prepared by coating a thermoplastic base film with a coating composition comprising a hydroxy-modified imine polymer, an antistatic agent and a crosslinking agent.

* * * * *